(12) United States Patent
Cohen et al.

(10) Patent No.: US 9,779,528 B2
(45) Date of Patent: Oct. 3, 2017

(54) TEXT REALIZATION

(71) Applicant: Microsoft Technology Licensing, LLC, Redmond, WA (US)

(72) Inventors: Miles Cohen, Seattle, WA (US); Anthony John Rolls Hodsdon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/485,387

(22) Filed: Sep. 12, 2014

(65) Prior Publication Data

US 2016/0078655 A1    Mar. 17, 2016

(51) Int. Cl.

| | |
|---|---|
| *G06T 11/20* | (2006.01) |
| *G06T 11/60* | (2006.01) |
| *G06K 9/18* | (2006.01) |
| *G06K 9/46* | (2006.01) |
| *G06K 9/52* | (2006.01) |
| *G06T 1/20* | (2006.01) |
| *G06T 1/60* | (2006.01) |
| *G06T 11/40* | (2006.01) |

(52) U.S. Cl.
CPC ............... *G06T 11/60* (2013.01); *G06K 9/18* (2013.01); *G06K 9/4604* (2013.01); *G06K 9/52* (2013.01); *G06T 1/20* (2013.01); *G06T 1/60* (2013.01); *G06T 11/203* (2013.01); *G06T 11/40* (2013.01)

(58) Field of Classification Search
CPC ....................................................... G06T 11/60
USPC ........................................................ 345/468
See application file for complete search history.

(56) References Cited

U.S. PATENT DOCUMENTS

| | | | | |
|---|---|---|---|---|
| 6,738,526 B1 * | 5/2004 | Betrisey | ............... | G06T 11/203 358/1.9 |
| 6,978,230 B1 * | 12/2005 | Klosowski | .............. | G06T 17/20 345/420 |
| 7,142,220 B2 * | 11/2006 | Platt | ...................... | G06T 15/503 345/589 |
| 7,239,319 B2 | 7/2007 | Loop | | |
| 7,605,825 B1 * | 10/2009 | Lau | ....................... | G06T 11/203 345/428 |
| 7,623,130 B1 | 11/2009 | Burkey | | |
| 8,203,564 B2 | 6/2012 | Jiao et al. | | |
| 8,243,070 B1 | 8/2012 | Brown | | |

(Continued)

FOREIGN PATENT DOCUMENTS

WO    2014178902 A1    11/2014

OTHER PUBLICATIONS

"Geometry Realizations Overview", Retrieved at: <<http://msdn.microsoft.com/en-us/library/windows/desktop/dn363632(v=vs.85).aspx>>, Retrieved on: Aug. 18, 2014, 4 pages.

(Continued)

*Primary Examiner* — Javid A Amini
(74) *Attorney, Agent, or Firm* — Arent Fox LLP

(57) ABSTRACT

In one example, a graphics processing unit may use an optimized geometric realization to render a text shape as a scalable geometry. The graphics processing unit may generate an inner geometry for a text shape. The graphics processing unit also may generate a tessellated edge geometry abutting the inner geometry for an edge of the text shape. The graphics processing unit further may assign a coverage gradient to the tessellated edge geometry to create an anti-aliased edge for the text shape.

20 Claims, 21 Drawing Sheets

(56) References Cited

U.S. PATENT DOCUMENTS

| | | | |
|---|---|---|---|
| 8,325,177 B2 | 12/2012 | Lawrence et al. | |
| 8,483,498 B2* | 7/2013 | Brailovsky | G06K 9/6211 345/420 |
| 8,624,899 B2 | 1/2014 | Michail et al. | |
| 2004/0095589 A1 | 5/2004 | Arai | |
| 2004/0135795 A1 | 7/2004 | Raubacher et al. | |
| 2004/0263516 A1 | 12/2004 | Michail et al. | |
| 2010/0214294 A1 | 8/2010 | Li et al. | |
| 2011/0285747 A1* | 11/2011 | Kilgard | G06T 11/203 345/613 |
| 2011/0310102 A1 | 12/2011 | Chang | |
| 2011/0316871 A1 | 12/2011 | Srinivasan et al. | |
| 2012/0026216 A1* | 2/2012 | Brown Elliott | G09G 3/20 345/694 |
| 2013/0063475 A1 | 3/2013 | Cohen et al. | |
| 2013/0142323 A1* | 6/2013 | Chiarella | H04L 9/28 380/28 |
| 2014/0176589 A1 | 6/2014 | Duluk et al. | |

OTHER PUBLICATIONS

Loop, et al., "Rendering Vector Art on the GPU", Retrieved at: <<http://http.developer.nvidia.com/GPUGems3/gpugems3_ch25.html, Feb. 7, 2009, 19 pages.

Carucci, Francesco, "Inside Geometry Instancing", Retrieved at: <<http://http.developer.nvidia.com/GPUGems2/gpugems2_chapter03.html>>, May 17, 2008, 25 pages.

Rougier, Nicolas P., "Higher Quality 2D Text Rendering", In Journal of Computer Graphics Techniques, vol. 2, No. 1, Apr. 30, 2013, 14 pages.

Andrews, et al., "Anti-Aliasing for Geometries", U.S. Appl. No. 13/873,093, Apr. 29, 2013, 55 pages.

"International Search Report & Written Opinion for PCT Patent Application No. PCT/US2013/060773", Mailed Date: Dec. 6, 2013, Filed Date: Sep. 20, 2013, 13 Pages.

Crisu, et al.,"Efficient Hardware for Antialiasing Coverage Mask Generation", In Proceedings of Computer Graphics International, Jun. 19, 2004,16 Pages.

Akeley, Kurt, "Reality Engine Graphics", In Proceedings of the 20th Annual Conference on Computer Graphics and Interactive Techniques, Aug. 2, 1993, 8 Pages.

Pai, et al., "New Method for Analytic Antialiasing of a Polygon on Low end GPUs", In IP.com, Prior Art Database, Technical Disclosure, Jul. 19, 2012, 5 Pages.

"Geometry Realization Sample", Retrieved at: <<http://msdn.microsoft.com/enus/library/dd756659(v=vs.85).aspx>>, Sep. 6, 2011, 7 pages.

"ID2D1 Device Context: Draw Bitmap Method", Retrieved at: <<http://msdn.microsoft.com/en-us/library/hh847972(v=vs.85).aspx>>, Nov. 29, 2012, 3 pages.

Bunnell, Michael "Adaptive Tessellation of Subdivision Surfaces with Displacement Mapping", Retrieved at: <<http://http.developer.nvidia.com/GPUGems2/gpugems2_chapter07.html>>, Mar. 13, 2005, 4 Pages.

Fatahalian, et al., "Reducing Shading on GPUs using Quad-Fragment Merging", In Journal of ACM Transactions on Graphics, vol. 29, Issue 4, Jul. 2010, 8 pages.

Loop, Charles et al., "Resolution Independent Curve Rendering Using Programmable Graphics Hardware", In Journal of ACM Transactions on Graphics, vol. 24, Issue 3, Jul. 2005,10 pages.

Kilgard, et al., "GPU-accelerated Path Rendering", In ACM Transactions on Graphics, vol. 31, Issue 6, Nov. 2012, 10 Pages.

"International Search Report and Written Opinion Issued in PCT Application No. PCT/US2015/049543", Mailed Date: May 6, 2016, 16 Pages.

"Second Written Opinion Issued in PCT Application No. PCT/US2015/049543", Mailed Date: Feb. 8, 2017, 8 Pages.

Evans, et al., "Optimizing Triangle Strips for Fast Rendering", In Proceedings of IEEE 7th Conference on Visualization, Oct. 27, 1996, 8 Pages.

"International Preliminary Report on Patentability Issued in PCT Application No. PCT/US2015/049543", Mailed Date: Mar. 17, 2017, 9 Pages.

* cited by examiner

802

1300

1600

1700

1900

TEXT REALIZATION

BACKGROUND

A computing device may execute a variety of processing on graphic content to present that graphic content to a user. To display a complex image, the computing device may convert graphics data from complex geometries into simpler geometric primitives using tessellation. Tessellation divides a complex shape into a group of simple polygons, such as triangles, for processing. The computing device may execute a first "realization" pass to convert a geometry into an intermediate "realization" form for caching. The computing device then may execute a second "draw" pass to execute a transform on the cached intermediate realization to render a primitive shape.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a graphics processing unit using an optimized geometric realization to render a text shape as a scalable geometry. A central processing unit may generate an inner geometry for a text shape. The graphics processing unit also may generate a tessellated edge geometry abutting the inner geometry for an edge of the text shape. The graphics processing unit further may assign a coverage gradient to the tessellated edge geometry to create an anti-aliased edge for the text shape.

DRAWINGS

In order to describe the manner in which the above-recited and other advantages and features can be obtained, a more particular description is set forth and will be rendered by reference to specific examples thereof which are illustrated in the appended drawings. Understanding that these drawings merely depict examples, and are not, therefore, to be considered limiting of its scope, implementations will be described and explained with additional specificity and detail through the use of the accompanying drawings.

DETAILED DESCRIPTION

Figure 1:
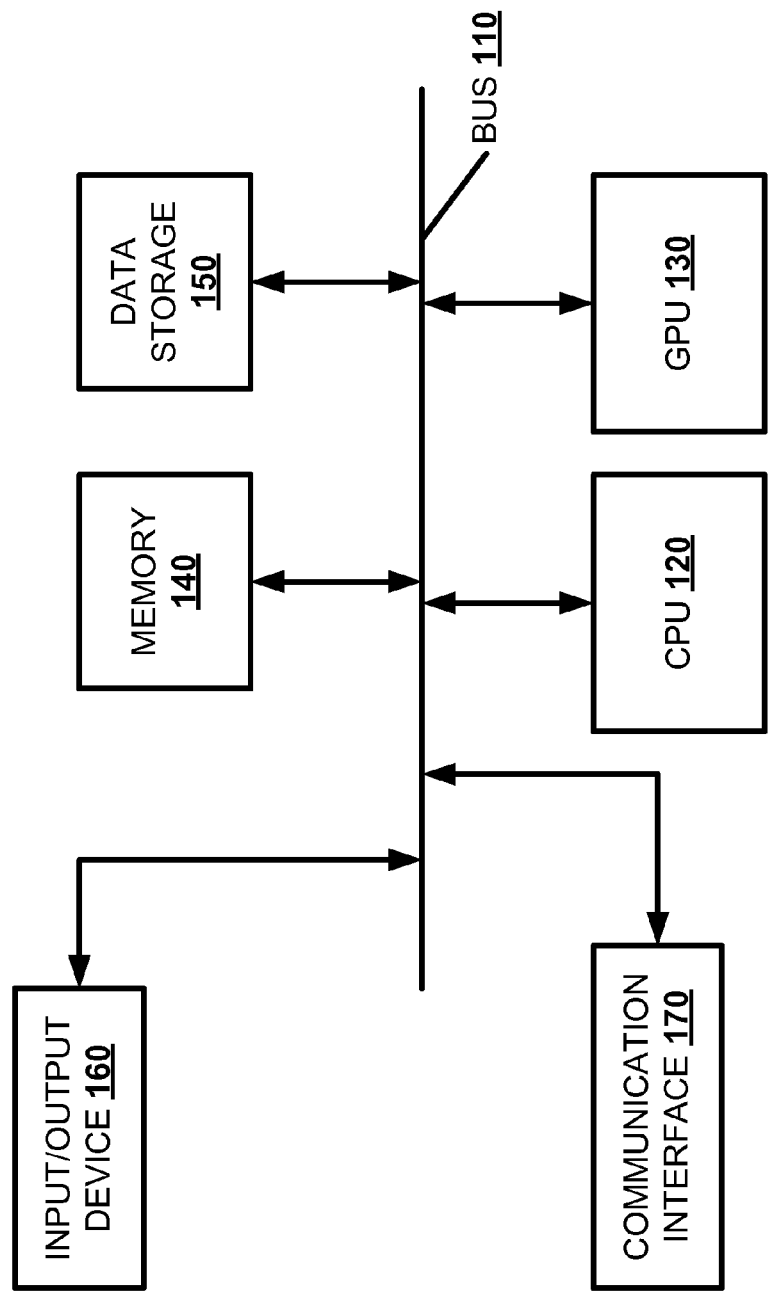
FIG. 1 illustrates, in a block diagram, an exemplary computing device.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a graphics processing unit.

A graphics processing unit may represent text in geometric, or "vector", form rather than as rasterized bitmap representation. The geometric representation may allow text to be rasterized during rendering, allowing text to quickly and efficiently be transformed, such as by translating, scaling, or zooming, without doing any per-pixel work on the central processing unit. The graphics processing unit may apply the transformation to the geometric representation. The graphics processing unit also may use a geometry realization to create an anti-aliased geometric representation, allowing anti-aliased text to be transformed during rendering.

Geometry realization may be optimized by using higher level graphics processing unit features to reduce the working set of geometry realizations. Specifically, the graphics processing unit may use "relative indexing" to implement smaller representation. Relative indexing also may allow multiple realizations to be stored in one atlas and rendered in any order using a single draw call on the graphics processing unit. The random access to these realizations provided by relative indexing may allow multiple text glyphs to be stored in a single cache object, rendered quickly and in any order. A glyph is an elemental representation of a text symbol.

Text rendered as a geometry realization may provide as good a quality for large text, but for smaller text, a bitmap representation may provide better quality. Thus, the graphics processing unit may store both geometric and bitmap based representations in the same GPU object, allowing both geometric and bitmap based text to be stored in a single cache.

Relative indexing may allow indices to be cached even when the order of objects is changing. Relative indexing may find the "neighbors" of a given vertex around the edge of a geometry. Additionally, relative indexing may lift any limitations on the number of vertices drawn in a single draw call by dividing an object into chunks. Each chunk of the object may be addressable by the index size. The relative index may avoid addressing the entire object, as the instance data may provide an initial index number to add to the relative index. The initial index number may have a larger range than the relative index, thereby allowing the two indices to combine together to cover a larger range. Since a single draw call may render multiple instances, each object chunk may be rendered at once with minimal overhead.

The graphics processing unit may store bitmap and geometries together in the same object for text data in the cache. In an alternate example, the graphics processing unit may store bitmap and geometries together in the same object for non-text data in the cache. The graphics processing unit also may use instancing and relative indexing to allow boundary triangles to be represented as a single index. The central processing unit may execute tessellation and outlining simultaneously. Moreover, the graphics processing unit may render text as geometry and cache the geometry.

Previously, a geometry realization first may create a geometric outline of the shape, and then may create an aliased tessellation from an outlined shape. Both the outline and the tessellation steps may be computationally complex, but share many of the same tasks. By combining tessellation and outlining, the computing device may reduce the number of times those tasks are executed.

Previously, a graphics processing unit may store an anti-aliased tessellation of a geometry. To provide anti-aliasing, the graphics processing unit may add additional triangles to the tessellation around the outside of the shape. Each triangle may contain a direction vector allowing the graphics processing unit to transform these additional triangles to be approximately one pixel wide regardless of the scale at which the geometry realization was rendered. By storing just the aliased triangle tessellation, the graphics processing unit may omit a large portion of the vertices and indices. Additionally, the graphics processing unit may compute the direction vectors while rendering, so the direction vectors no longer are stored as part of the representation. Finally, the graphics processing unit may represent most of the triangles of the realization using a single index rather than three indices. The graphics processing unit may imply the other two indices with the definition of a suitable instance data set for a triangle having at least one edge along the boundary of the shape.

The graphics processing unit buffer may store both geometric and bitmap data. The buffer may store vertices, indices, and bitmap data. To access the vertices and indices, the graphics processing unit may access the buffer using relative indexing. In relative indexing, the graphics processing unit may retrieve indices for each vertex from the buffer using a second level of indexing, rather than being supplied from a standard index buffer. Relative indexing may allow the graphics processing unit to cache and access indices in random order. To access bitmap data, the graphics processing unit may retrieve the bitmap data from the buffer. Because bitmap text data does not use interpolation, the graphics processing unit may use a buffer load command. Storing bitmap data in a buffer may allow the cache to be one-dimensional rather than a two-dimensional atlas. A one dimensional memory layout may allow for tighter packing of glyphs within the cache.

Thus, in one example, a graphics processing unit may use an optimized geometric realization to render a text shape as a scalable geometry. The graphics processing unit also may generate an inner geometry for a text shape. A central processing unit further may generate a tessellated edge geometry abutting the inner geometry for an edge of the text shape. Moreover, the graphics processing unit may assign a coverage gradient to the tessellated edge geometry to create an anti-aliased edge for the text shape.

FIG. 1 illustrates a block diagram of an exemplary computing device 100 which may process graphic data. The computing device 100 may combine one or more of hardware, software, firmware, and system-on-a-chip technology to process graphic data. The computing device 100 may include a bus 110, a central processing unit 120, a graphics processing unit 130, a memory 140, a data storage 150, an input/output device 160, and a communication interface 170. The bus 110, or other component interconnection, may permit communication among the components of the computing device 100.

The central processing unit 120 may include at least one conventional processor or microprocessor that interprets and executes a set of instructions. The graphics processing unit 130 may include at least one processor or microprocessor specialized for processing graphic data. The memory 140 may be a random access memory (RAM) or another type of dynamic data storage that stores information and instructions for execution by the central processing unit 120. The memory 140 also may store temporary variables or other intermediate information used during execution of instructions by the central processing unit 120. The data storage 150 may include a conventional ROM device or another type of static data storage that stores static information and instructions for the central processing unit 120. The data storage 150 also may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored, on computer-readable media, as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 150 may store a set of instructions detailing a method that when executed by one or more processors cause the one or more processors to perform the method.

The input/output device 160 may include one or more conventional mechanisms that permit a user to input information to the computing device 100, such as a keyboard, a mouse, a voice recognition device, a microphone, a headset, a gesture recognition device, a touch screen, etc. The input/output device 160 also may include one or more conventional mechanisms that output information to the user, including a display, a printer, one or more speakers, a headset, or a medium, such as a memory, or a magnetic or optical disk and a corresponding disk drive. The communication interface 170 may include any transceiver-like mechanism that enables computing device 100 to communicate with other devices or networks. The communication interface 170 also may include a network interface or a transceiver interface. The communication interface 170 may be a wireless, wired, or optical interface.

The computing device 100 may perform such functions in response to the central processing unit 120 executing sequences of instructions contained in a computer-readable medium, such as, for example, the memory 140, a magnetic disk, or an optical disk. Such instructions may be read into the memory 140 from another computer-readable medium, such as the data storage 150, or from a separate device via the communication interface 170.

Figure 2:
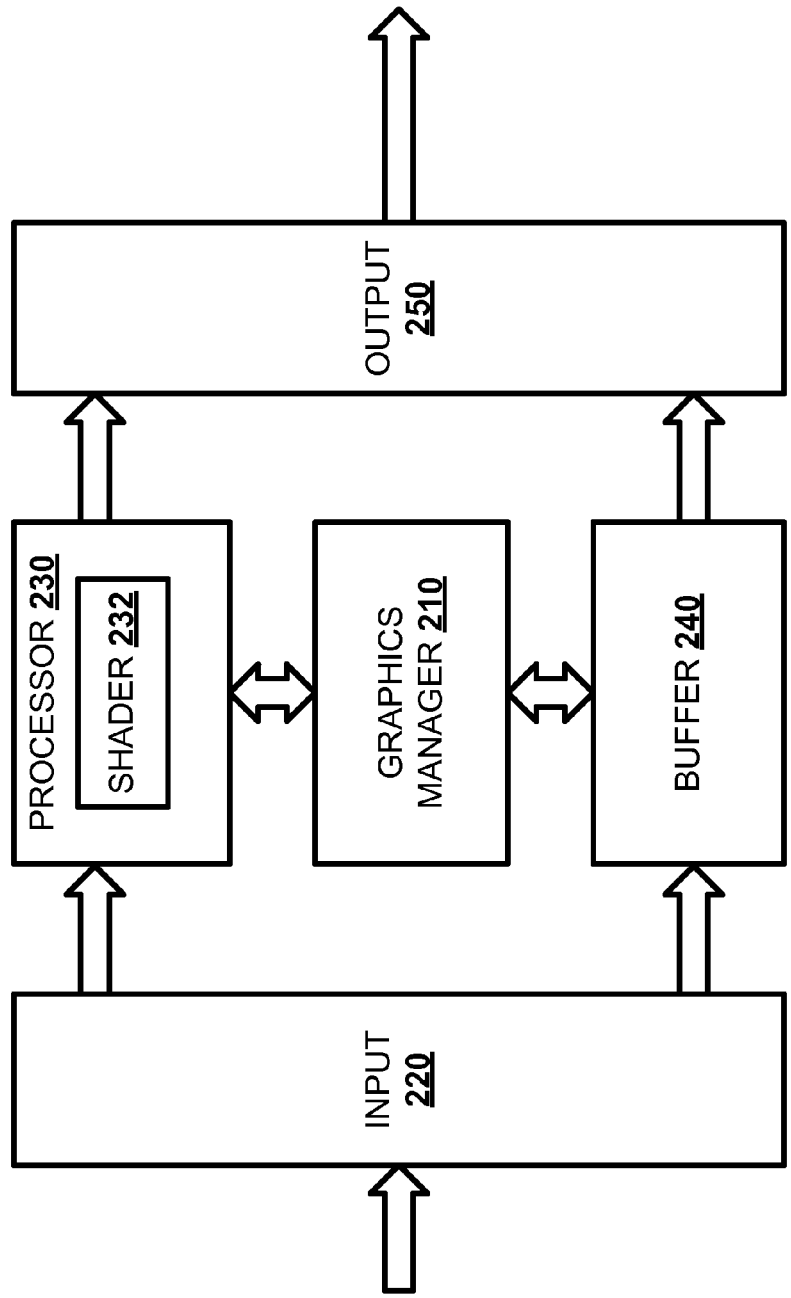
FIG. 2 illustrates, in a block diagram, an exemplary graphics processing unit.

FIG. 2 illustrates, in a block diagram, an exemplary graphics processing unit 130. The graphics processing unit 130 may have a graphics manager 210 to direct operations by the graphics processing unit 130. The graphics processing unit 130 may have an input 220 for receiving a graphic data set to process for display by the computing device 100. A graphic data set may be a digital image, a graphic, a video, or other digital image. The graphic data set also may be a geometry or a text shape. A text shape is a geometry that forms a letter or a series of letters.

The graphics processing unit 130 may have one or more graphics processors 230 to process the graphic data set. The graphics processor 230 may implement a shader 232 to execute the processing of the graphic data set. A shader 232 on the graphics processing unit 130 is a programmable function called in parallel at a fixed position within the graphics pipeline.

The graphics processing unit 130 may have a graphics buffer 240 for storing the graphics data set and graphics transform instructions. The graphics buffer 240 may represent the geometry by storing indices referencing a set of vertices indicating a boundary triangle set around a boundary of the geometry maintained in an order of the boundary triangle set. The graphics processor 230 may imply a first edge vertex and a second edge vertex of a boundary triangle of a boundary triangle set from a pointer vertex index. The graphics buffer 240 also may store a bitmap data set with a geometry data set for the geometry in a one-dimensional layout. The graphics processing unit 130 further may have an output 250 to provide the processed graphic data set.

The graphics buffer 240 may use a fixed point representation for text vertices, which allows each coordinate to be represented in a two byte value. Geometry realizations may be more likely than text to use a large range, so geometry realizations may use a floating point representation. To simplify memory policy, the graphics processing unit 130 may place realization vertices and indices into the same graphics buffer 240. Placing all the data in a single graphics buffer 240 may avoid wasting memory during overflow. The graphics processing unit 130 may place the vertices of each individual glyph in the buffer before the indices of that glyph. In order to place bitmaps in the graphics buffer 240 as well, the graphics processing unit 130 may introduce specific shaders for bitmap text. Because bitmap text may use nearest neighbor sampling from the text cache, the graphics processing unit 130 may substitute this instruction with a load instruction to get the data from the graphics buffer 240 instead.

The graphics processing unit 130 may work with the central processing unit 120 to execute a realization and drawing process on the geometry to present the geometry to a user. For example, the central processing unit 120 may generate a tessellated inner geometry for the shape, a tessellated edge shape abutting the inner geometry for each edge of the geometry, and a vertex shape at each geometry vertex. The central processing unit 120 also may assign a coverage gradient to the tessellated edge geometry to create an anti-aliased edge for the geometry.

To generate a realization, the central processing unit 120 may execute a scanner module, similar to the aliased tessellation module, and may construct a tessellation of inner and exterior vertices. The scanner module may produce an implicit outline of the geometry and store the implicit outline in a graph of vertices and chains in the scanner data structures. This implicit outline may be a set of chains, connected by scanner junctions. Each chain may have a set of vertices that decrease monotonically in the vertical direction. The scanner module may mark the chains as "left" or "right" depending on whether the chain is on the left or right side of the finable area. The scanner module may treat "left" chains as being oriented downward, and "right" chains as being oriented upward.

Upon generating a geometry, the graphics processing unit 130 may draw a boundary line surrounding the geometry by selecting pixels at the boundary. Using standard pixel selection to draw the boundary lines may create a stair-step effect, referred to as "aliasing". The graphics processing unit 130 may execute an "anti-aliasing" operation, referred to as geometry realization, to remove the stair-step effect.

Figure 3:
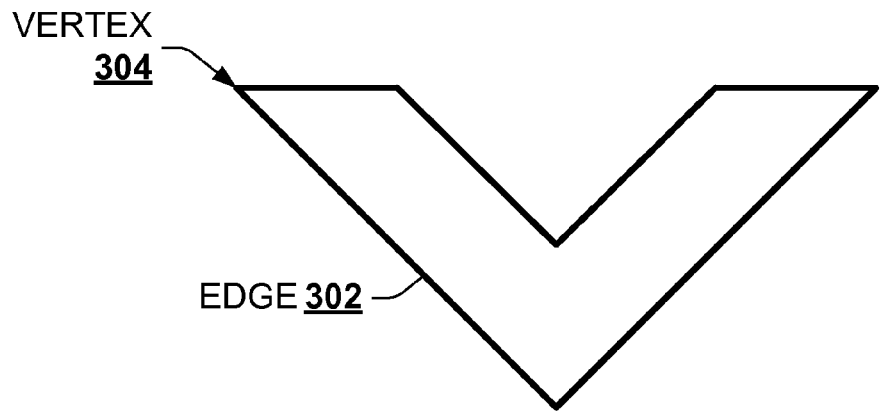
FIG. 3 illustrates, in a block diagram, an exemplary shape.

For an example using one type of anti-aliasing operation, FIG. 3 illustrates, in a block diagram, an exemplary geometry 300. The geometry 300 may represent a polygon that is generated as part of an initial graphics realization operation. For instance, the geometry 300 may be a data representation of a graphics primitive that is generated by executing geometry flattening and removing self-intersecting lines from the geometry 300. Geometry flattening replaces geometries containing curved segments with appropriate polygonal approximations. The graphics processing unit 130 may receive the geometry 300 as part of a graphics data set. The geometry 300 may have an edge 302 for each side of the geometry 300. The geometry 300 also may have a vertex 304 at the intersection of two edges 302.

Figure 4:
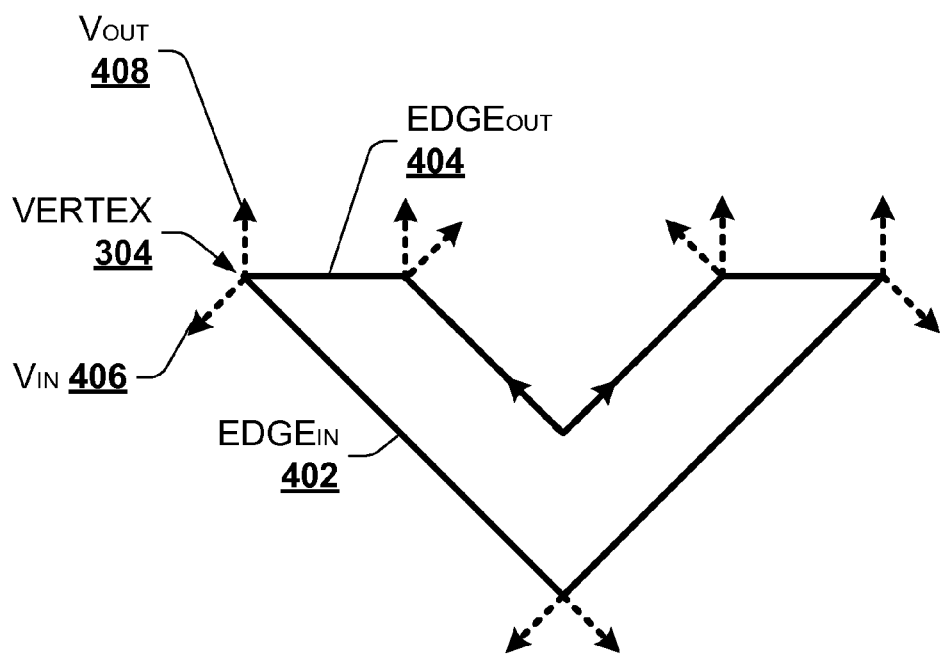
FIG. 4 illustrates, in a block diagram, an exemplary annotated shape.

The graphics processing unit 130 may annotate the geometry 300 with various vectors useful for generating a set of boundary shapes, such as triangles and quadrilaterals, at each edge of the geometry 300. FIG. 4 illustrates, in a block diagram, an exemplary annotated geometry 400. The vertex 304 may have an incoming edge (EDGE$_{IN}$) 402 and an outgoing edge (EDGE$_{OUT}$) 404. The graphics processing unit 130 may calculate a normal vector having a length of one directed perpendicularly outward from each edge 302 of the geometry 300. For each vertex 304 of the annotated geometry 400, the graphics processing unit 130 also may calculate an incoming edge normal vector (V$_{IN}$) 406 for the incoming edge 402 at the vertex 304. The graphics processing unit 130 further may calculate an outgoing edge normal vector (V$_{OUT}$) 408 for the outgoing edge 404 at the vertex 304. While in this example the incoming edge normal vector 406 and the outgoing edge normal vector 408 are calculated in a clockwise fashion, the graphics processing unit 130 may similarly make these calculations in a counterclockwise fashion.

Figure 5:
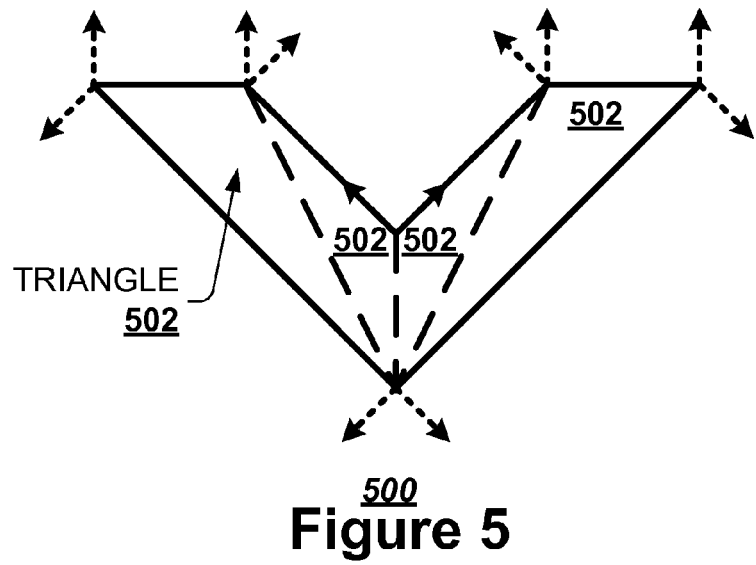
FIG. 5 illustrates, in a block diagram, an exemplary tessellated shape.

The graphics processing unit 130 then may tessellate the geometry 300, thereby dividing the geometry 300 into a set of interior triangles. FIG. 5 illustrates, in a block diagram, an exemplary tessellated geometry 500. To generate the tessellated geometry 500, the graphics processing unit 130 may divide the annotated geometry 400 into a set of primitive shapes, such as triangles 502. The graphics processing unit 130 may tessellate the annotated geometry 400 into triangles 502 having vertices that exist in the original geometry 300.

The graphics processing unit 130 may prevent the triangles 502 from overlapping. The graphics processing unit 130 also may arrange the interior triangles to be "watertight", so that any two triangles 502 sharing an edge share the entire edge and have no T-junctions.

Figure 6:
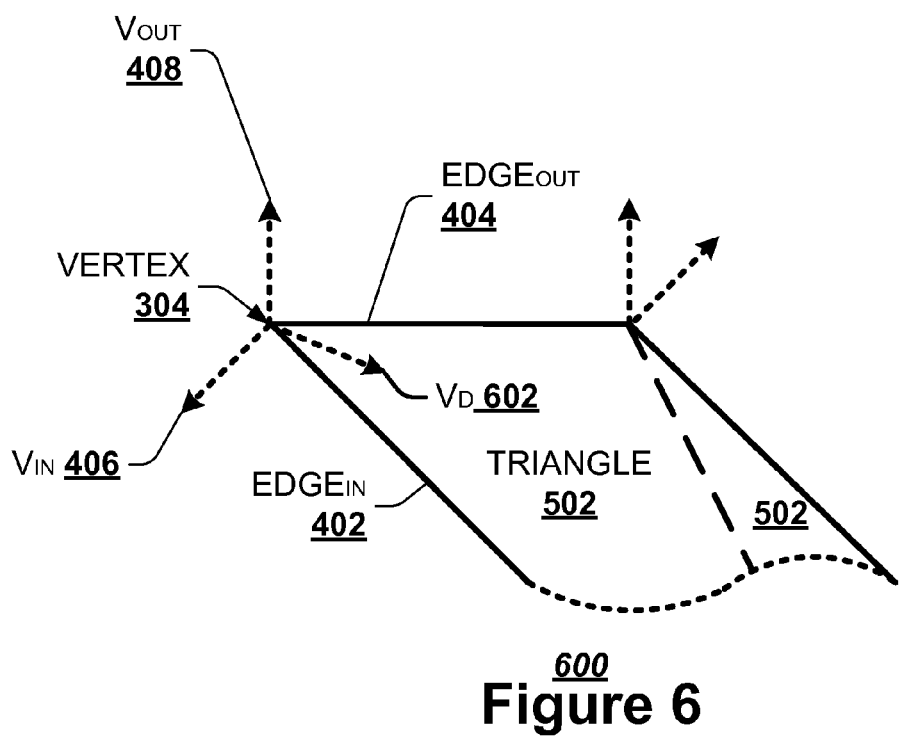
FIG. 6 illustrates, in a block diagram, an exemplary annotated vertex.

FIG. 6 illustrates, in a block diagram, an exemplary annotated vertex 600. The graphics processing unit 130 may annotate each vertex of the geometry 400 with the position of the vertex 304 in Cartesian coordinates, an incoming edge normal vector 406, and an outgoing edge normal vector 408. The graphics processing unit 130 may calculate a displacement vector ($V_D$) 602 for the vertex 304 as a negative average function of the incoming edge normal vector 406 and the outgoing edge normal vector 408. As with the edge normal vectors, the displacement vector 602 may have a length of one.

Figure 7:
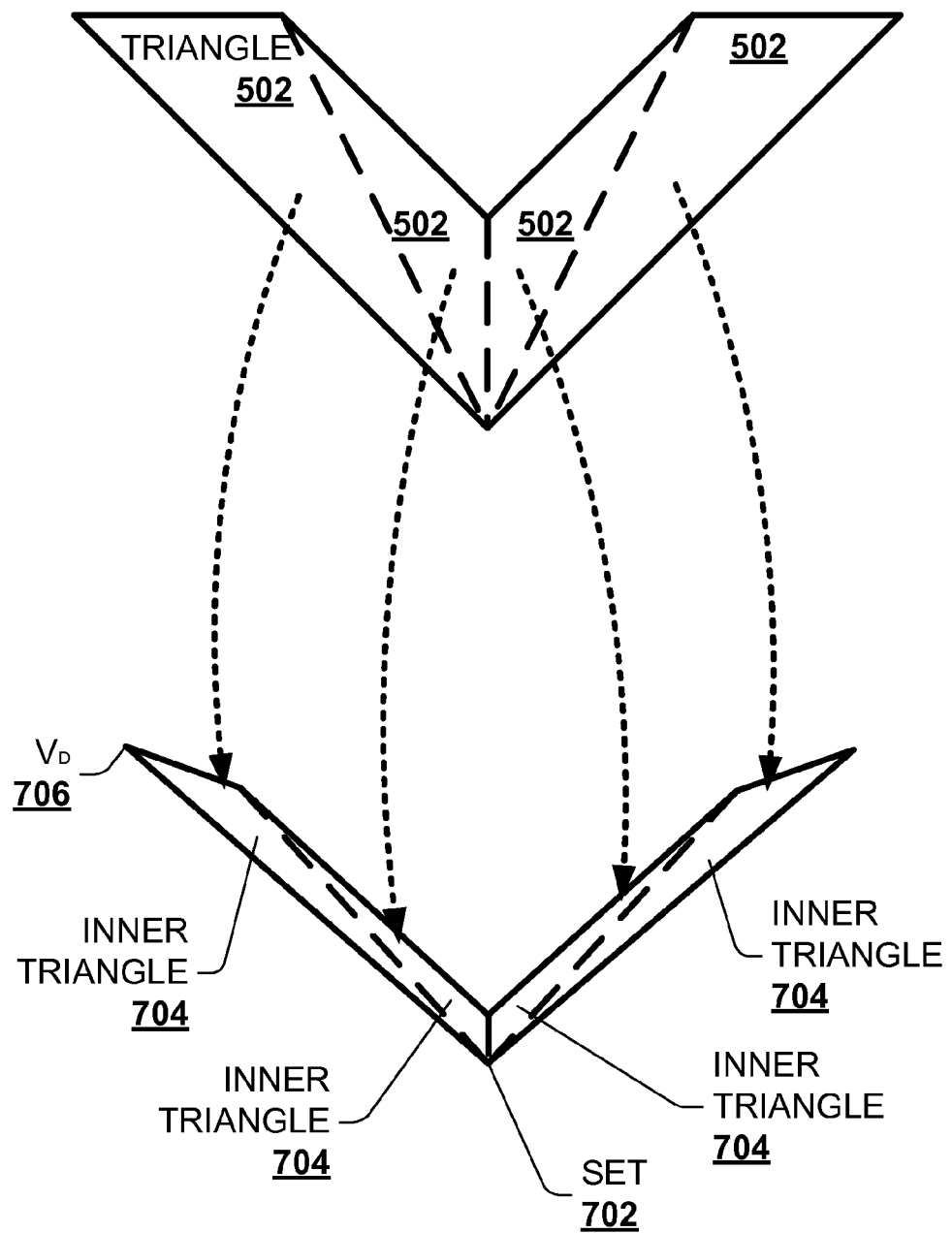
FIG. 7 illustrates, in a block diagram, an exemplary inner geometry generation.

FIG. 7 illustrates, in a block diagram, an exemplary inner geometry generation 700. The graphics processing unit 130 may process the previously generated triangles 502 to create a set 702 of inner triangles 704 representing the interior of the geometry 300. The graphics processing unit 130 also may implement a vertex shader to inset the previously generated triangles 502 by shifting the vertices 304 to a displaced vertex 706 based on the length and angle of the displacement vector 602. A vertex shader is a rendering application dedicated to the processing of vertices.

Figure 8:
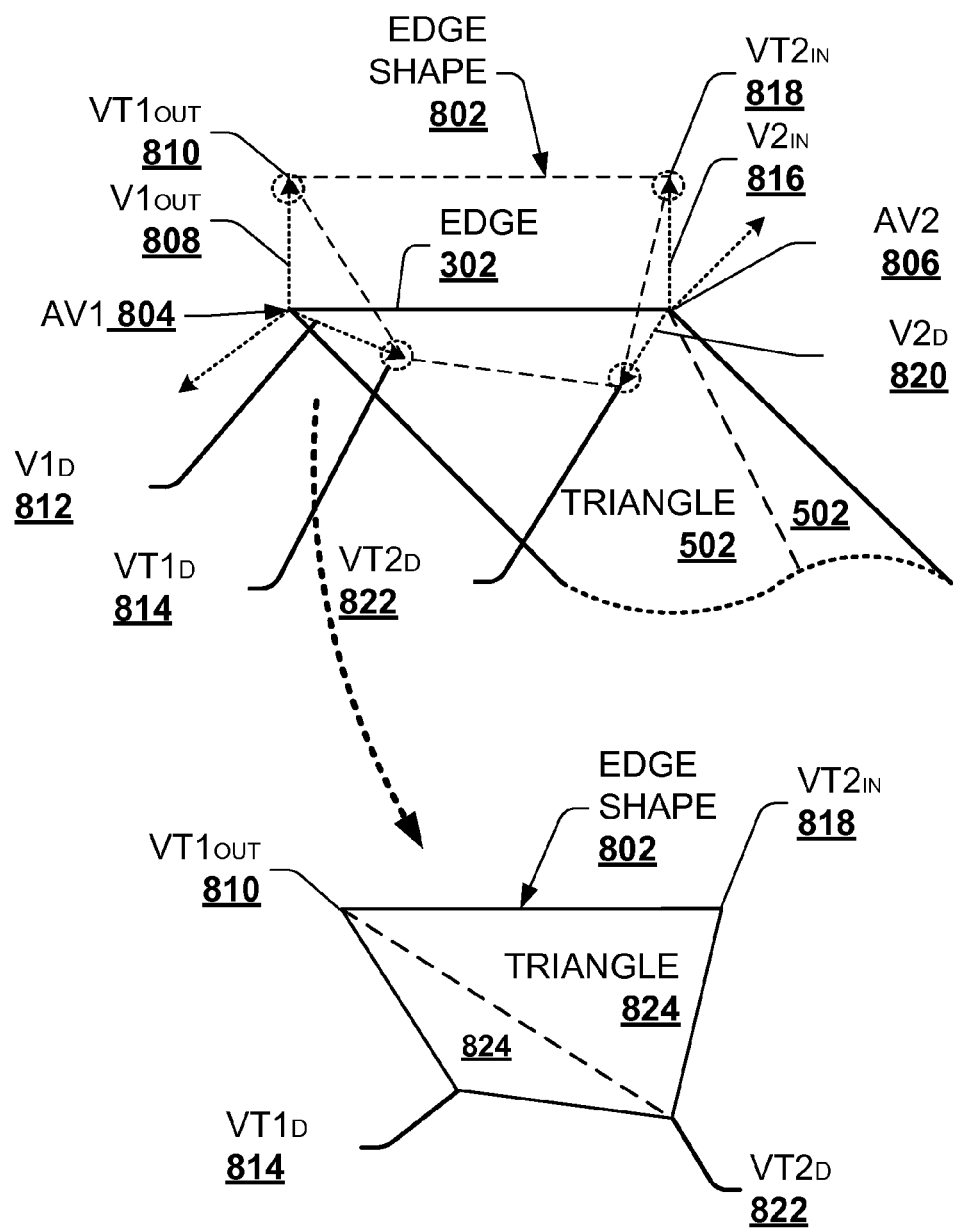
FIG. 8 illustrates, in a block diagram, an exemplary edge shape generation.

FIG. 8 illustrates, in a block diagram, an exemplary edge shape generation 800. The graphics processing unit 130 may generate an edge shape 802 to represent an edge 302 of the geometry 300. For example, the edge shape 802 may be an "alpha ramp quadrilateral" used to apply anti-aliasing during rendering.

Each edge 802 may have a first anchor vertex (AV1) 804 and a second anchor vertex (AV2) 806. The graphics processing unit 130 may use the first anchor vertex 804 and an associated first outgoing edge normal vector ($V1_{OUT}$) 808 to calculate a first outgoing vertex ($VT1_{OUT}$) 810 for the edge shape 802. The graphics processing unit 130 also may use the first anchor vertex 804 and an associated first displacement vector ($V1_D$) 812 to calculate a first displacement vertex ($VT1_D$) 814 for the edge shape 802. The graphics processing unit 130 further may use the second anchor vertex 806 and an associated second incoming edge normal vector ($V2_{IN}$) 816 to calculate a second incoming vertex ($VT2_{IN}$) 818 for the edge shape 802. Moreover, the graphics processing unit 130 may use the second anchor vertex 806 and an associated second displacement vector ($V2_D$) 820 to calculate a second displacement vertex ($VT2_D$) 822 for the edge shape 802.

The graphics processing unit 130 then may use the first outgoing vertex 810, the second incoming vertex 818, the second displacement vertex 822, and the first displacement vertex 814 to generate the edge shape 802. Each vertex may have a coverage gradient indicating the opacity of the vertex. For example, the vertices on the interior of the original geometry 300, such as the first displacement vertex 814 and the second displacement vertex 822, may have a coverage gradient of one, indicating that pixels at those vertices are opaque relative to the opacity of the geometry 300. The vertices on the exterior of the original geometry 300, such as the first outgoing vertex 810 and the second incoming vertex 818, may have a coverage gradient of zero, indicating that pixels at those vertices are completely transparent. The graphics processing unit 130 then may tessellate the edge shape 802 into two edge shape triangles 824 for further processing.

Figure 9:
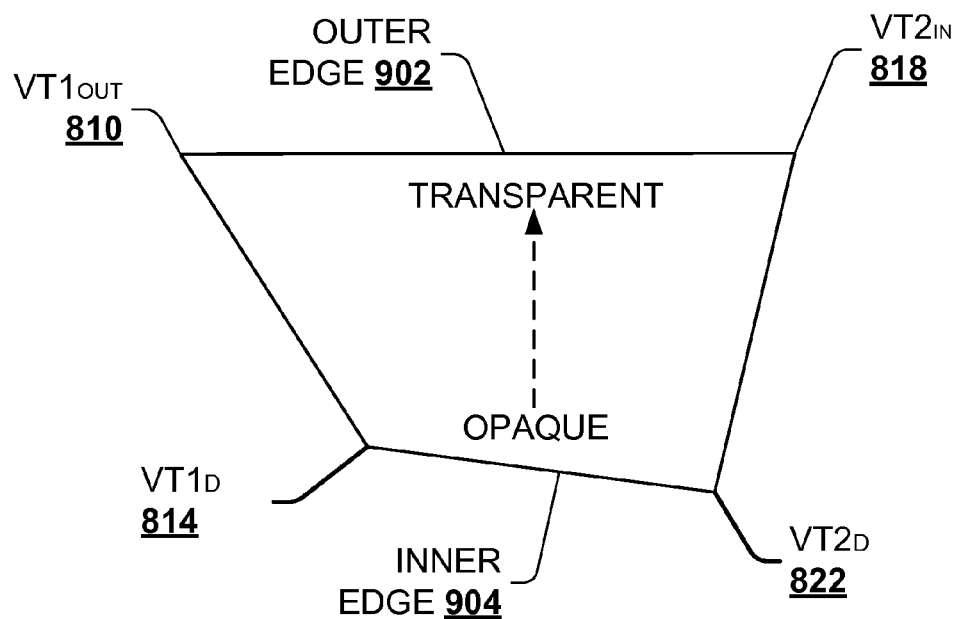
FIG. 9 illustrates, in a block diagram, an exemplary edge shape.

FIG. 9 illustrates, in a block diagram, an exemplary edge shape 802. The edge shape 802 may have an outer edge 902 located exterior to the original geometry 300. The edge shape 802 may have an inner edge 904 located interior to the original geometry 300. The edge shape 802 also may have a coverage gradient that transitions from opaque at the inner edge 904 to transparent at the outer edge 902. The transition may be at a constant rate. Additionally, the graphics processing unit 130 may generate the edge shape 802 according to a particular width, such as a pixel width, to maintain consistent anti-aliasing as the geometry is scaled.

Figure 10:
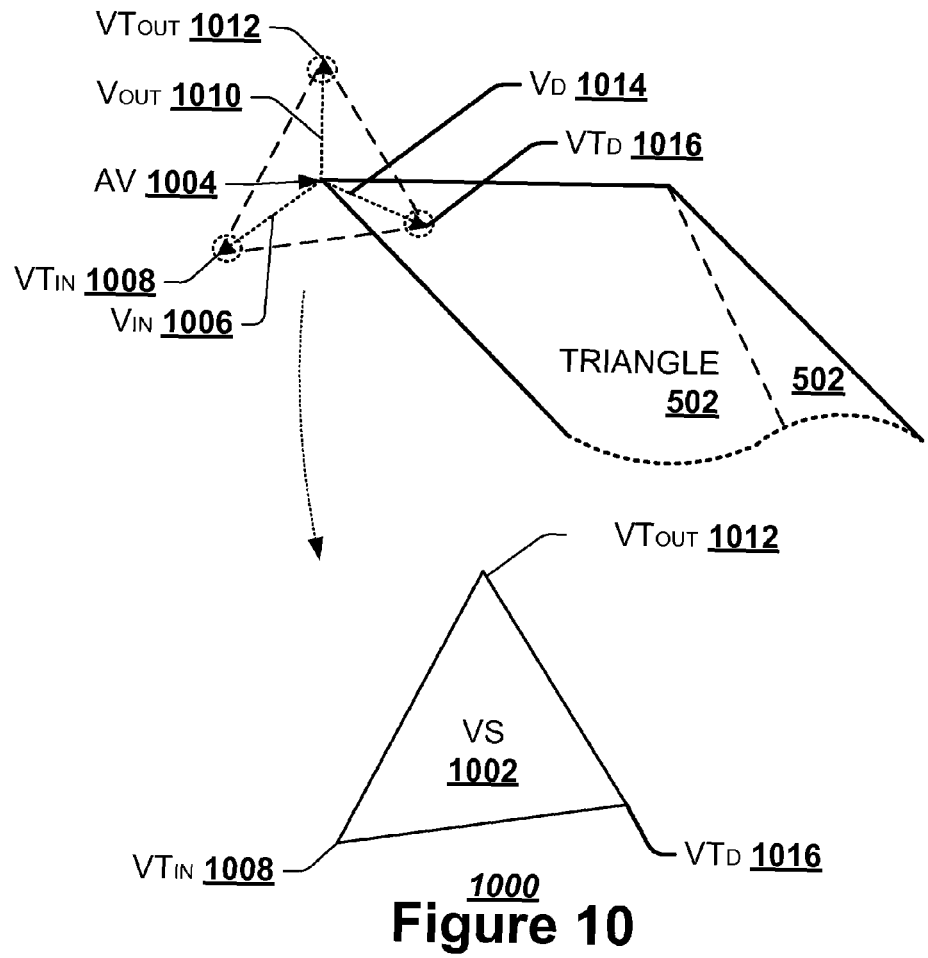
FIG. 10 illustrates, in a block diagram, an exemplary vertex shape generation.

FIG. 10 illustrates, in a block diagram, an exemplary vertex shape generation 1000. The graphics processing unit 130 may generate a vertex shape (VS) 1002, such as a bevel, to represent each convex vertex 304 of the geometry 300. A convex vertex 304 is a vertex where the incoming edge 402 and the outgoing edge 404 have an interior angle of less than 180 degrees. For example, the vertex shape 1002 may be an "alpha ramp bevel" used to apply anti-aliasing during rendering.

Each vertex 304 may act as an anchor vertex 1004 to locate the vertex bevel 1002. The graphics processing unit 130 may use the anchor vertex 1004 and an associated incoming edge normal vector ($V_{IN}$) 1006 to calculate an incoming vertex ($VT_{IN}$) 1008 for the vertex shape 1002. The graphics processing unit 130 may use the anchor vertex 1004 and an associated outgoing edge normal vector ($V_{OUT}$) 1010 to calculate an outgoing vertex ($VT_{OUT}$) 1012 for the vertex shape 1002. The graphics processing unit 130 may use the anchor vertex 1004 and an associated displacement vector ($V_D$) 1014 to calculate a displacement vertex ($VT_D$) 1016 for the vertex shape 1002.

The graphics processing unit 130 then may use the incoming vertex 1008, the outgoing vertex 1012, and the displacement vertex 1016 to generate the vertex shape 1002. Each vertex of the vertex shape 1002 may have a coverage gradient indicating the opacity of the vertex. For example, the vertices on the interior of the original geometry 300, such as the displacement vertex 1016, may have a coverage gradient of one, indicating that pixels at those vertices are opaque relative to the opacity of the geometry 300. The vertices on the exterior of the original geometry 300, such as the incoming vertex 1008 and the outgoing vertex 1012, may have a coverage gradient of zero, indicating that pixels at those vertices are completely transparent.

Figure 11:
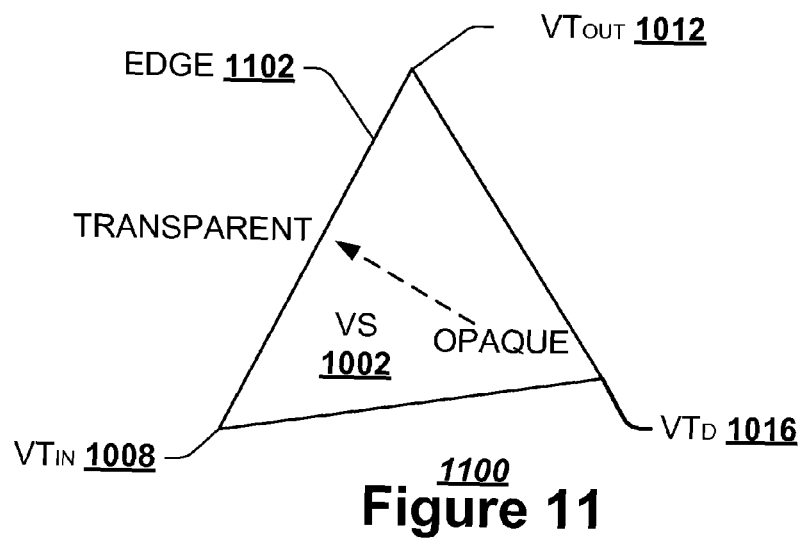
FIG. 11 illustrates, in a block diagram, an exemplary vertex shape.

FIG. 11 illustrates, in a block diagram, an exemplary vertex shape 1002. The vertex shape 1002 may have an outer edge 1102 located exterior to the original geometry 300. The vertex shape 1002 may have a coverage gradient that transitions from opaque at the displacement vertex 1016 to transparent at the outer edge 1102. The transition may be at a constant rate. Additionally, the graphics processing unit 130 may generate the vertex shape 1002 according to a particular width, such as a pixel width, to maintain consistent anti-aliasing as the geometry is scaled.

Figure 12:
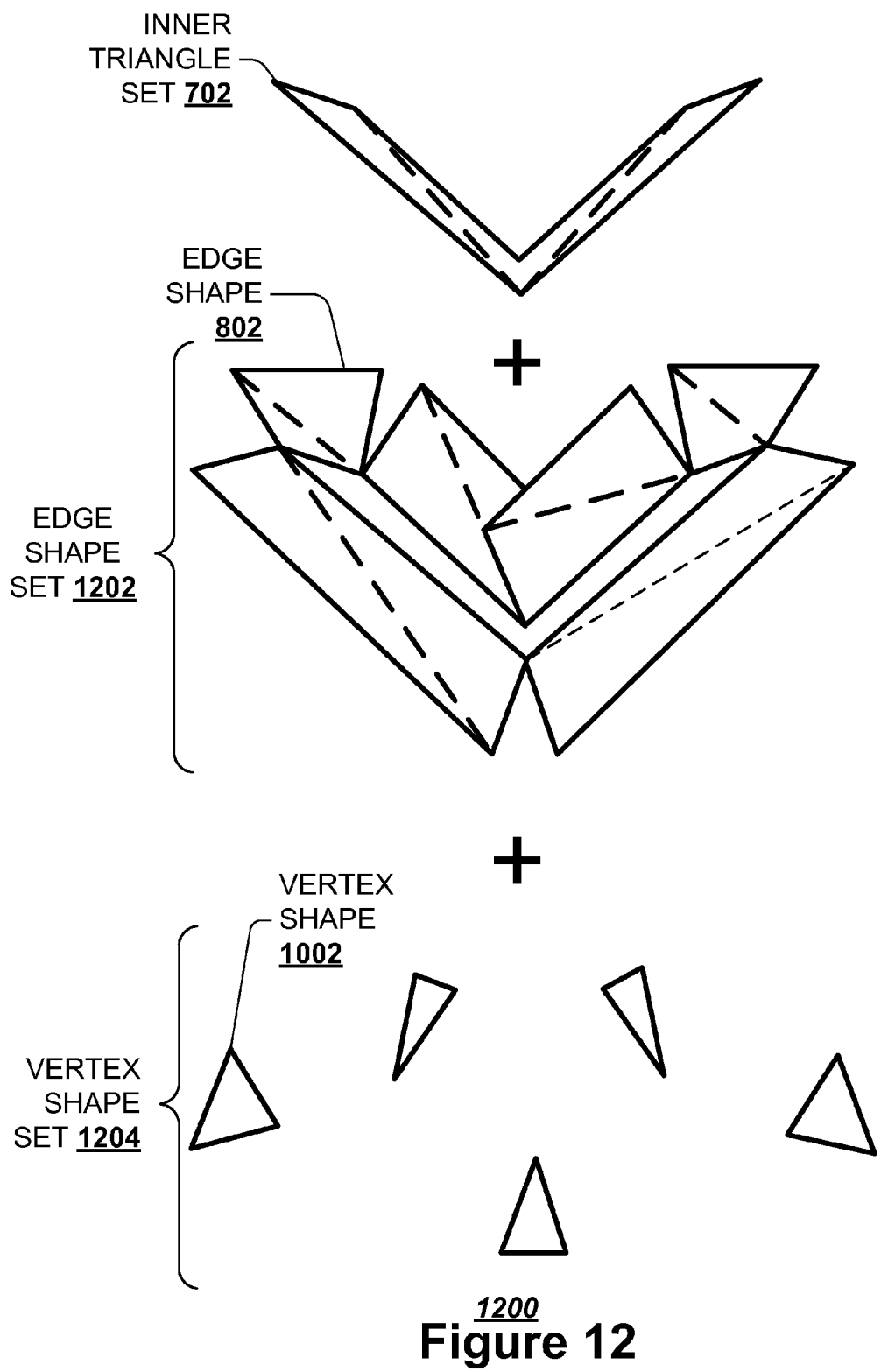
FIG. 12 illustrates, in a block diagram, an exemplary compartmentalized realization.

FIG. 12 illustrates, in a block diagram, an exemplary compartmentalized realization 1200. The graphics processing unit 130 may generate an inner triangle set 702 to represent the interior of the original geometry 300. The graphics processing unit 130 may generate an edge shape set 1202 having an edge shape 802 to represent each edge 302 of the original geometry 300. The graphics processing unit 130 may generate a vertex shape set 1204 having a vertex shape 1002 to represent each vertex 304 of the original geometry 300.

Figure 13:
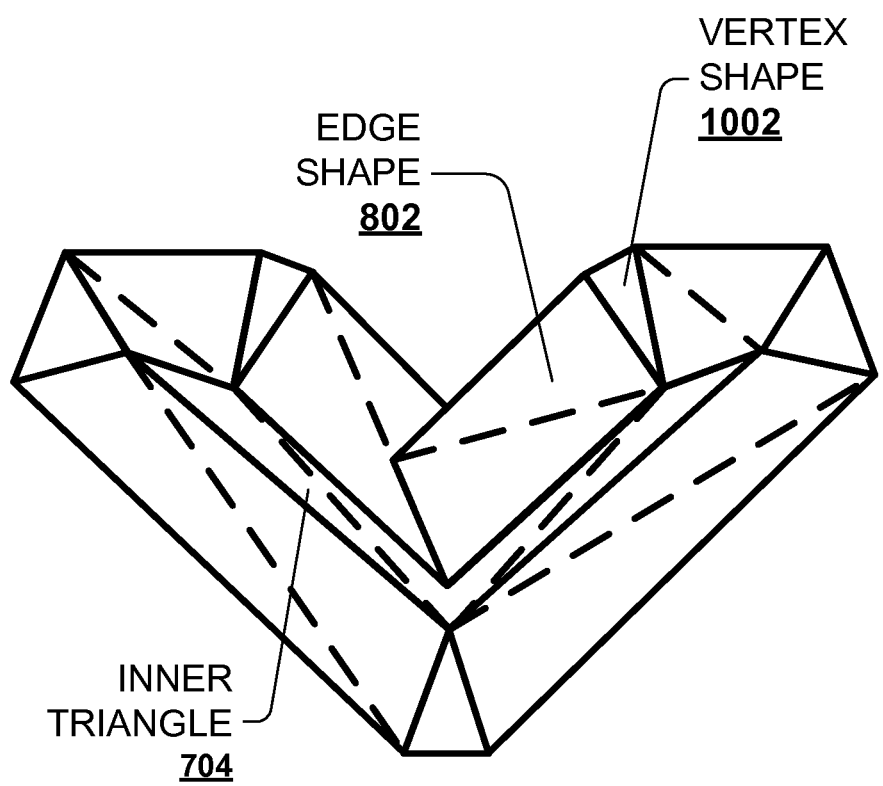
FIG. 13 illustrates, in a block diagram, an exemplary integrated realization.

FIG. 13 illustrates, in a block diagram, an exemplary integrated realization 1300. The graphics processing unit 130 may combine the inner triangle set 702, the edge shape set 1202, and the vertex shape set 1204 to create a realized geometry. The inner triangle set 702 may maintain the opacity of the original geometry 300. The edge shape set 1202 and the vertex shape set 1204 may transition from opacity at the interior to transparency at the exterior to create the illusion of a smooth edge 302 for the original geometry 300, thus anti-aliasing the original geometry 300 at rendering. Further, the underlying geometric attributes may allow the anti-aliasing of the original geometry 300 to be scale independent.

Figure 14:
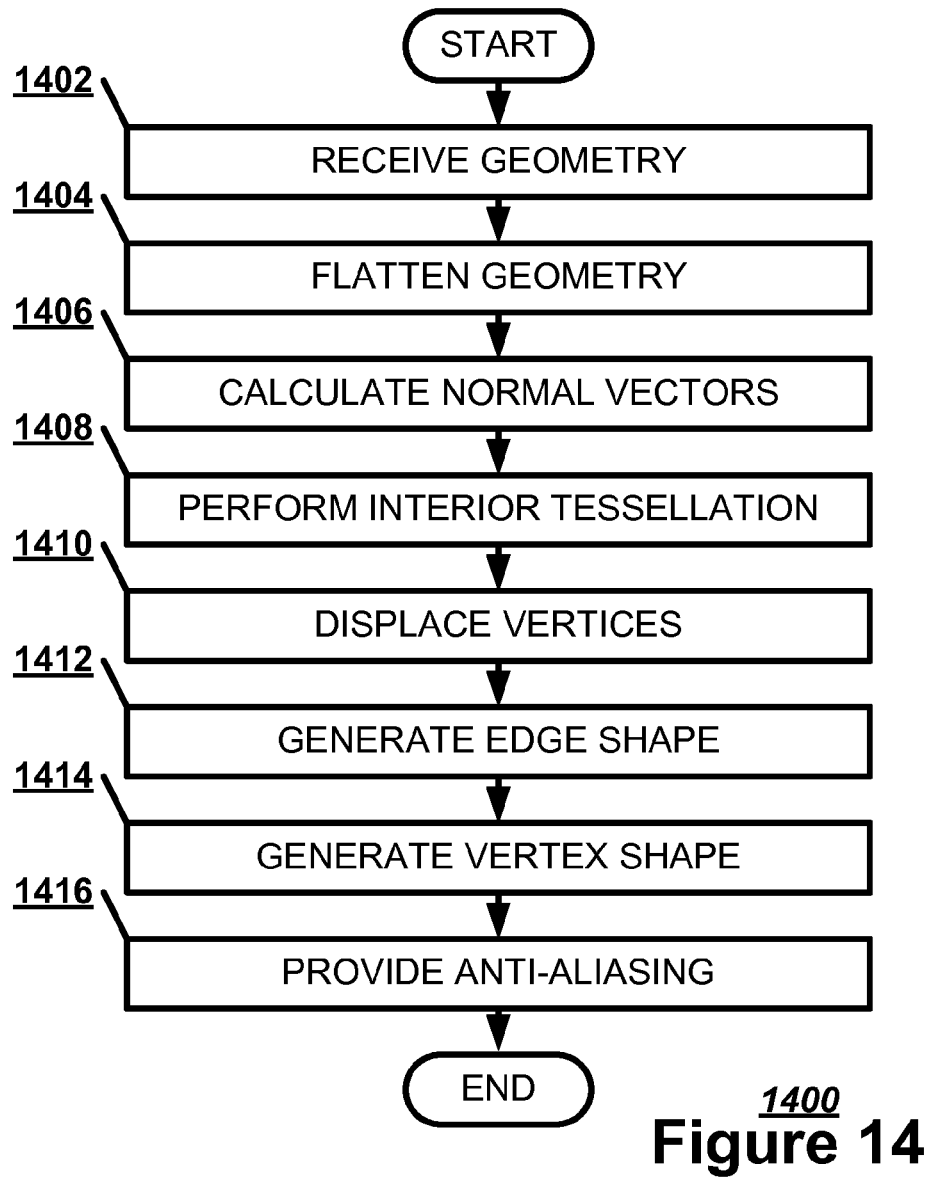
FIG. 14 illustrates, in a flowchart, an exemplary method of shape realization.

FIG. 14 illustrates, in a flowchart, an exemplary method 1400 of geometry realization. A central processing unit, such as the central processing unit 120, may receive a geometry, such as geometry 300, for rendering (Block 1402). The geometry may be a primitive geometry or collection of primitive geometries received from an application as part of a graphic image for display. The central processing unit may flatten the geometry and remove any self-intersecting lines (Block 1404). For example, the graphics processing unit may convert any curved forms into a polygonal approximation. The graphics processing unit may calculate an incoming edge normal vector and an outgoing edge normal vector for each edge of the geometry (Block 1406). The central processing unit may perform an interior tessellation on the geometry to generate a tessellated geometry (Block 1408). A graphics processing unit, such a graphics processing unit 130, may process the tessellated geometry to generate an inner triangle set by displacing the vertices according to a displacement vector for each vertex (Block 1410). The graphics processing unit further may generate an edge shape for each edge of the geometry (Block 1412). The graphics processing unit further more may generate a vertex shape for each vertex of the geometry (Block 1414). Moreover, the graphics processing unit may process the inner triangle set, the edge shape set, and the vertex shape set for display to provide anti-aliasing of the geometry (Block 1416).

Figure 15:
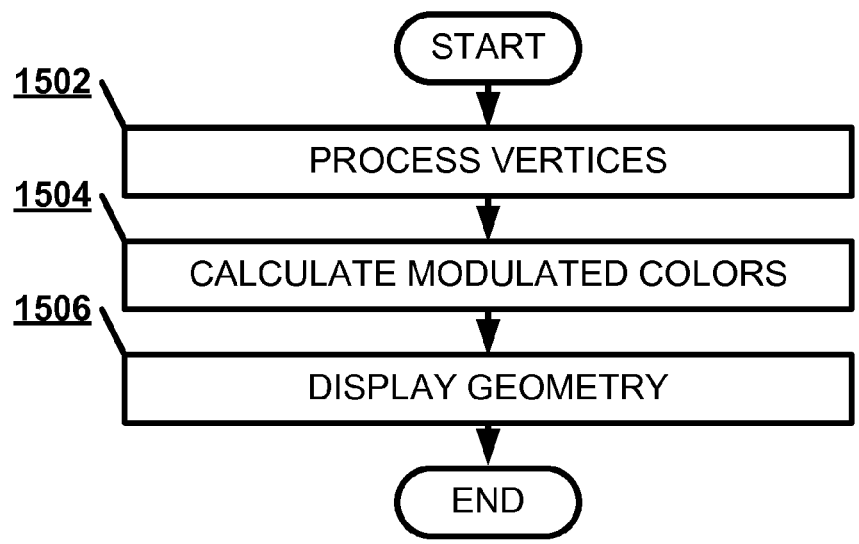
FIG. 15 illustrates, in a flowchart, an exemplary method of shape rasterization.

The graphics processing unit may prepare the inner triangle set, the edge shape set, and the vertex shape set for rendering and rasterization. FIG. 15 illustrates, in a flowchart, an exemplary method 1500 of geometry rasterization. The graphics processing unit may process the realized geometry to generate a position and coverage for each of the vertices (Block 1502). The graphics processing unit also may calculate modulated colors for each of the vertices (Block 1504). The graphics processing unit further may display the geometry based on the positions and modulated colors for each vertex (Block 1506).

This anti-aliasing operation may be applied to a text shape, as well as a common geometry. As these text shapes, referred to as glyphs, often may be complex, this anti-aliasing operation may be improved by incorporating relative indexing. Relative indexing may allow the graphics processing unit to calculate the normal vectors on an ad hoc basis by reading the neighboring vertices.

Figure 16:
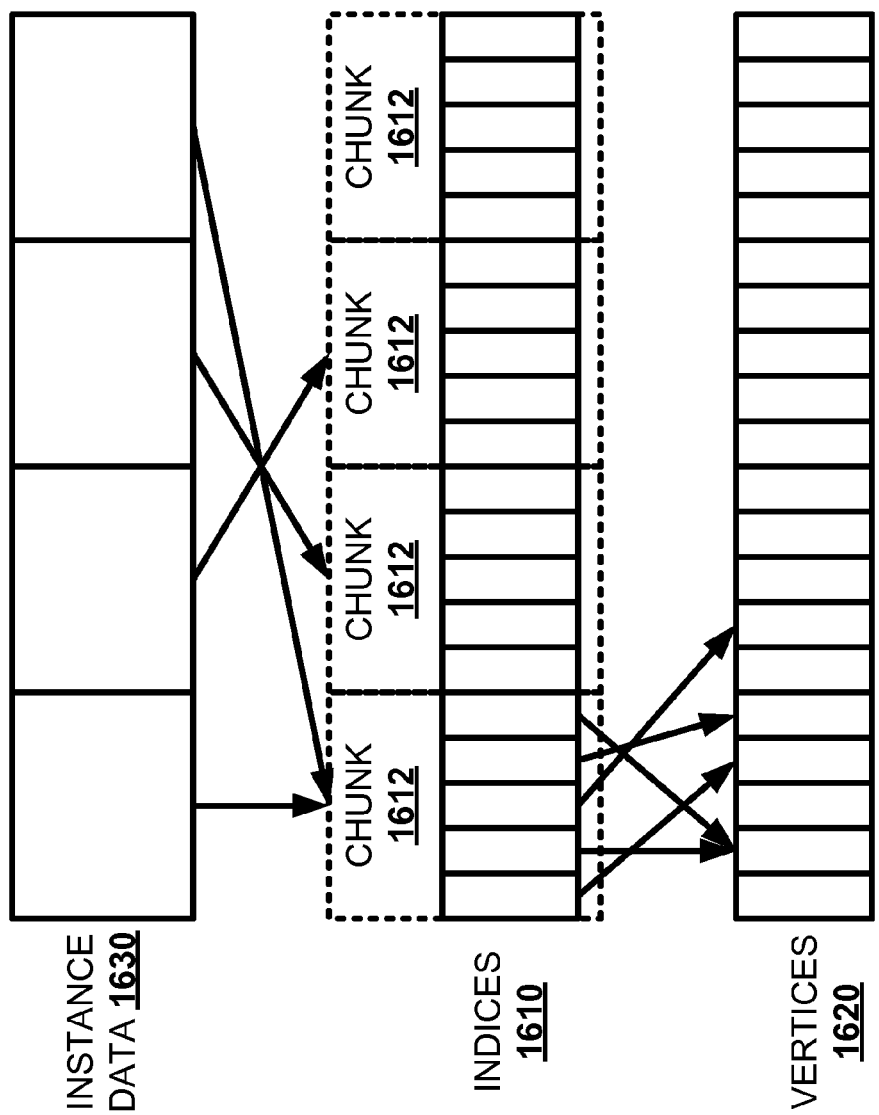
FIG. 16 illustrates, in a block diagram, an exemplary relative indexing mapping.

FIG. 16 illustrates, in a block diagram, an exemplary relative indexing mapping 1600. The graphical processing unit 130 may render multiple glyphs at multiple locations using a single "Draw" call via relative indexing. The graphics processing unit 130 may store in the graphics buffer 240 a realization index data set 1610. Each index may point to a vertex 1620 of a glyph, represented by a set of coordinates. The graphics processing unit 130 may divide the realization index data set 1610 into chunks 1612, with each chunk 1612 having a fixed number of indices 1610. The graphics processing unit 130 may generate an instance data 1630 for a glyph generation run, such that each instance 1630 references a chunk 1612. For example, if a glyph contains three index chunks 1612, then the graphics processing unit 130 references the three instances 1630 to render that glyph each time the glyph appears on a screen. This relative indexing allows the graphics processing unit 130 to render multiple glyphs in multiple locations without duplicating the glyph data. The instance data 1630 may contain the data to position the glyphs, while the index data 1610 and the vertex data 1620 may contain the actual glyph data.

A vertex shader may displace the vertices of the geometry 300 to produce inset and outset vertices. The vertex shader may build a mesh that has separate vertices for the interior and the exterior of the geometry 300. Each vertex may contain a displacement direction indicating the vertex shader placement of a displaced vertex. Previously, the mesh may have contained the inner triangle set 702, the edge shape set 1202, and the vertex shape set 1204. The graphics processing unit 130 may simplify storage in the shader by limiting transmission to the vertex shader of just the tessellated geometry 500. By using relative indexing, the vertex shader may find neighboring vertices on the geometry and calculate the displacement directions for the edge shapes 802 and vertex shapes 1002.

Figure 17:
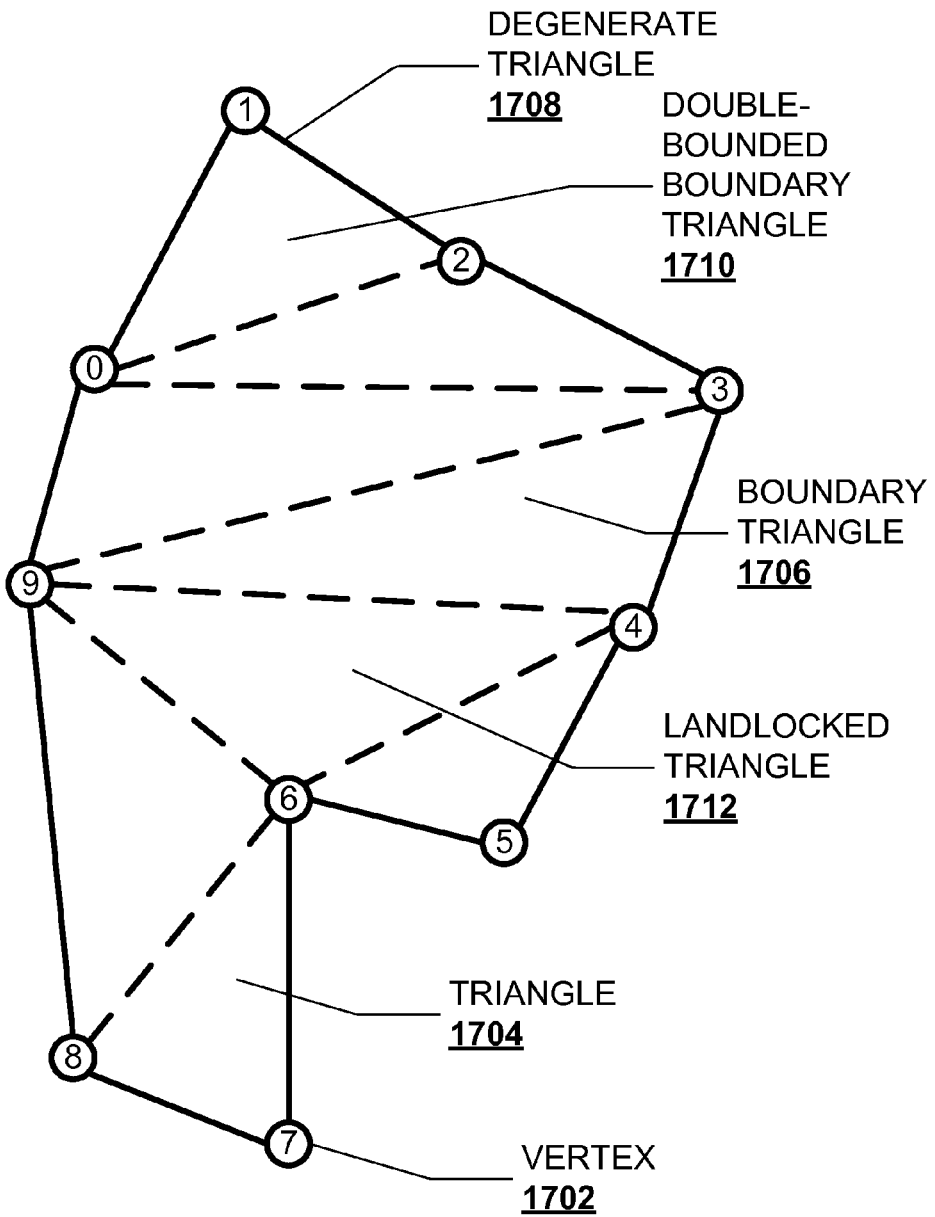
FIG. 17 illustrates, in a block diagram, an exemplary tessellated geometry using sequential boundary triangles.

Specifically, the vertex shader may store triangles 502 in the tessellated geometry 500 in a sequential boundary triangle format. FIG. 17 illustrates, in a block diagram, an exemplary tessellated geometry 1700 using sequential indices. The graphics processing unit 130 may represent the tessellated geometry 170 by establishing (x,y) coordinates for each vertex 1702, then index each vertex 1702 sequentially around the edge of the tessellated geometry 1700. The tessellated geometry 1700 may be divided into a set of triangles 1702. In a standard format, the graphics processing unit 130 may use three indexes per triangle 1704 to describe the tessellation. In this example, the triangles may be described as follows:

(0,1,2), (2,3,0), (3,4,9), (4,5,6), (6,7,8), (8,9,6), (6,9,4).

The majority of the triangles 1704 in this example are boundary triangles 1706, or triangles 1706 that have at least one edge on the boundary of the geometry 1700. The graphics processing unit 130 may describe each of these boundary triangles sequentially, with a single index, by incorporating a degenerate triangle 1708 to assist with a double-bounded boundary triangle 1710 that has two or more edges on the boundary. A degenerate triangle 1708 is a triangle with just two sides created to maintain the boundary sequence for double-bounded boundary triangles 1710. The graphics processing unit 130 may describe the same set of triangles described above, including any degenerate triangles 1708 and minus any landlocked triangles 1712, as follows:

(0,1,2), (1,2,2), (2,3,0), (3,4,9), (4,5,6), (6,7,8), (7,8,8), (8,9,6).

As the first two indices of the triangle form a sequence, the graphics processing unit 130 may imply their presence and not store them, resulting in the following:

2, 2, 0, 9, 6, 6, 8, 8, 3.

Such a referencing system may not describe a landlocked triangle 1712, or a triangle 1704 with no edge on a boundary, such as triangle (4,6,9) in this example. The graphics processing unit 130 may represent the landlocked triangle 1712 with three indices, as opposed to one index. To allow the representation of the boundary triangle 1706 to co-exist with the representation of the landlocked triangle 1712, the graphics processing unit 130 may segregate storage of the boundary triangle representation from the landlocked triangle representation. The instance data 1630 may distinguish between the one coordinate boundary triangle representation and the three coordinate landlocked triangle representation using a bit to indicate a landlocked triangle 1712.

In addition to this bit, the vertex shader may read a landlocked offset on the vertices for a landlocked triangle. While a boundary triangle 1706 may share vertices with a neighbor, a landlocked triangle may not share the canonical vertices, described below, with any other triangle. However, a boundary triangle 1706 may use the same index for a vertex as a landlocked triangle 1712. To avoid duplicating vertices and vertex invocations in the boundary triangle case, the vertex shader may use a canonical index buffer to share some vertices across two adjacent triangles. To avoid sharing these vertices, the vertex shader may use the landlocked offset for the landlocked triangle 1712 so that the connecting triangles between two adjacent input boundary triangles become degenerate.

Figure 18:
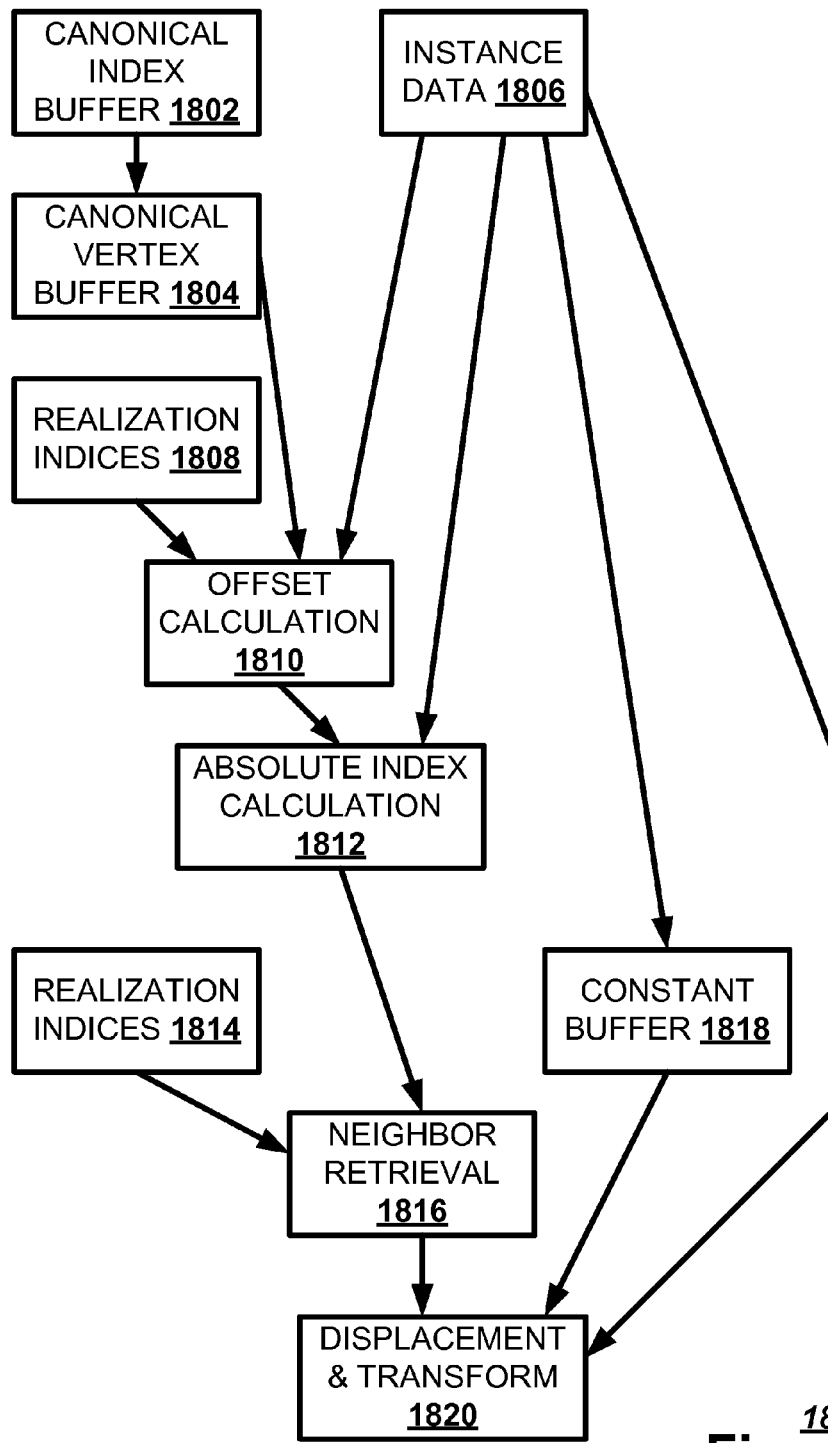
FIG. 18 illustrates, in a block diagram, an exemplary vertex shader code architecture.

The instancing approach may use various different kinds of input data to render geometry realizations. The computing device 100 may separate out the different inputs to keep data sent to the hardware to a minimum for each rendering. FIG. 18 illustrates, in a block diagram, an exemplary vertex shader code architecture 1800. The vertex shader may have a canonical index buffer 1802 describing indices of an instance of a data form. The canonical index buffer 1802 may index to a canonical vertex buffer 1804. The canonical vertex buffer 1804 may store instance vertices describing vertex attributes, such as the boundary offset, the boundary offset type, the landlocked offset, or the displacement direction. The boundary offset may describe a vertex of a boundary triangle 1706. The boundary offset type may describe whether the vertex is sequential or indexed. The landlocked offset may describe a vertex of a landlocked triangle 1712. The displacement direction may describe whether the vertex is for an inner triangle, an edge triangle, or a vertex triangle.

The canonical index buffer 1802 and the canonical vertex buffer 1804 may describe an instance with a fixed number of triangles, although the specific number of triangles may be tuned. Due to the fixed instance size, the vertex shader may render geometry data in chunks, adding degenerate triangles at the end of the last chunk so that each instance contains a full set of data. For example, if the instance size is thirty triangles and a geometry has one hundred triangles, the graphics processing unit 130 may use four sets of instance data to describe the geometry. The first three instances may each contain thirty triangles, while the last instance may contain ten useful triangles, and twenty degenerate triangles.

The canonical index buffer 1802 and the canonical vertex buffer 1804 may describe the boundary triangles 1706 by generating vertices for triangles that circumnavigate the geometry. To describe an aliased triangle, each triangle may have two sequential vertices and one indexed vertex. The canonical vertices may identify the correct index into the canonical vertex buffer 1804. Indexed boundary vertices may route through the canonical index buffer 1802. Sequential boundary vertices may describe the vertices directly.

Figure 19:
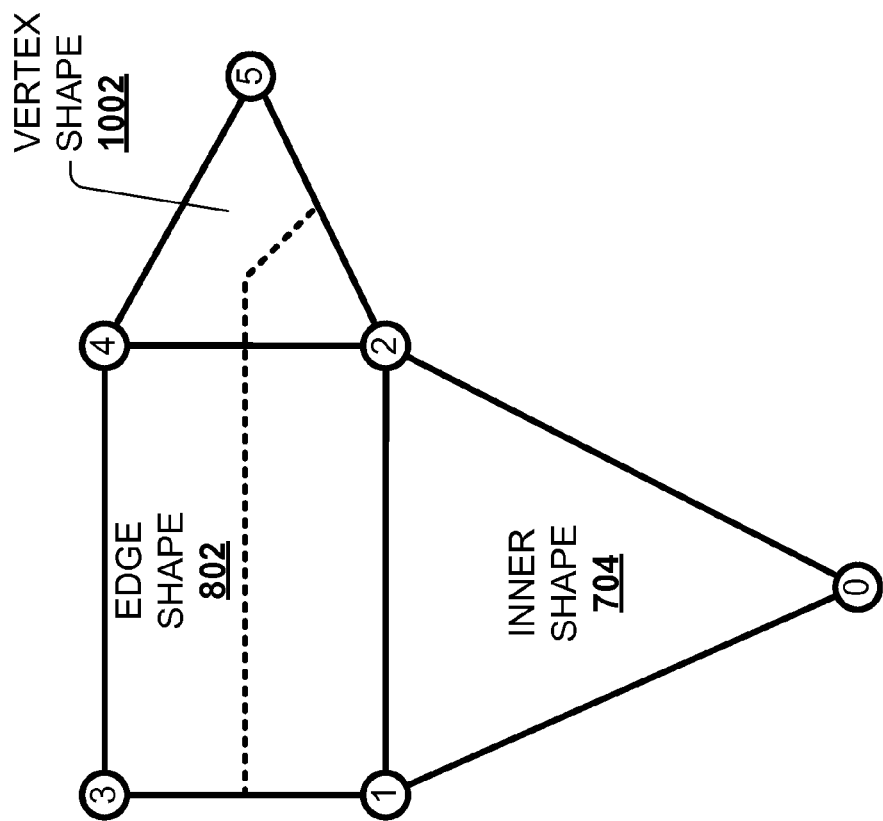
FIG. 19 illustrates, in a block diagram, an exemplary anti-aliased boundary triangle.

To describe anti-aliased boundary triangles, the vertex shader may use more attributes. FIG. 19 illustrates, in a block diagram, an exemplary anti-aliased boundary shape 1900. An anti-aliased boundary shape 1900 may have an inner shape 704, an edge shape 802, and a vertex shape 1002. The vertex shader may combined these three shapes to form the boundary of a geometry. The interior point of an inner triangle may be placed anywhere on the geometry that is an indexed vertex. The other vertices may be sequential.

In the example of FIG. 19, the boundary vertex type for each vertex is sequential, except for vertex 0. The boundary offset for vertices 0, 1, and 3 is zero, with the boundary offset for vertices 2, 4, and 5 being one. Vertices 0, 1, and 2 represent an inset displacement direction, vertices 3 and 4 represent an outset displacement direction, and vertex 5 represents a bevel displacement direction. In this example, vertex 5 may be the same vertex as vertex 3 of the next anti-aliased triangle, just as vertex 2 may be the same vertex as vertex 1 of the next anti-aliased triangle.

Adding more triangles to the instance may add more vertices. Each input triangle stored in the instance uses a similar set of vertices as the example, but with boundary offsets that are incremented by one from the previous triangle in the instance. In order to speed up vertex shader computation on the graphics processing unit 130, the vertex shader may use indexing so that vertices which appear in more than one triangle of the tessellated output are limited to a single evaluation. Drawing each shape may use four triangles with six vertices. Further, a boundary triangle may share two vertices with a previous triangle in the instance. Therefore, the graphics processing unit 130 may render each anti-aliased triangle with fewer invocations of the vertex shader.

Returning to FIG. 18, the graphics processing unit 130 may receive an instance data set 1806. The instance data set 1806 may describe the rendering of a chunk of realization indices, the base offsets for indexing, and other variable metadata. For example, the instance data set 1806 may have the initial index number and the instance type. The instance type may describes whether the instance is an edge triangle or a landlocked triangle. A realization index 1808 may describe relative index data for a given geometry realization.

An offset calculation function 1810 may receive the realization index 1808; the boundary offset type, the boundary offset, and the landlocked offset from the canonical vertex buffer 1804; and the initial index number and the instance type from the instance data set 1806. The offset calculation function 1810 may use this data to calculate the realization offset. An absolute index calculation function 1812 may use the realization offset and the initial vertex number from the instance data set 1806 to calculate a realization index.

A realization vertex 1814 may describe the position data for a particular geometry realization. A neighbor retrieval calculation function 1816 may use the realization vertex 1814 and the realization index to identify the current position, the previous position, and the next position.

A constant data buffer 1818 may store data describing information about the brush and transform components with minimal variation over time. The brush maps from pixel positions to color values. The constant data buffer 1818 may use a constant data buffer index provided in the instance data set 1806 to provide rotation and scale information. A displacement and transform function 1820 may use the current position, the previous position, and the next position from the neighbor retrieval calculation function 1816; the rotation and scale information form the constant data buffer 1818, and a transform translation to identify the position and transform for the instance.

Figure 20:
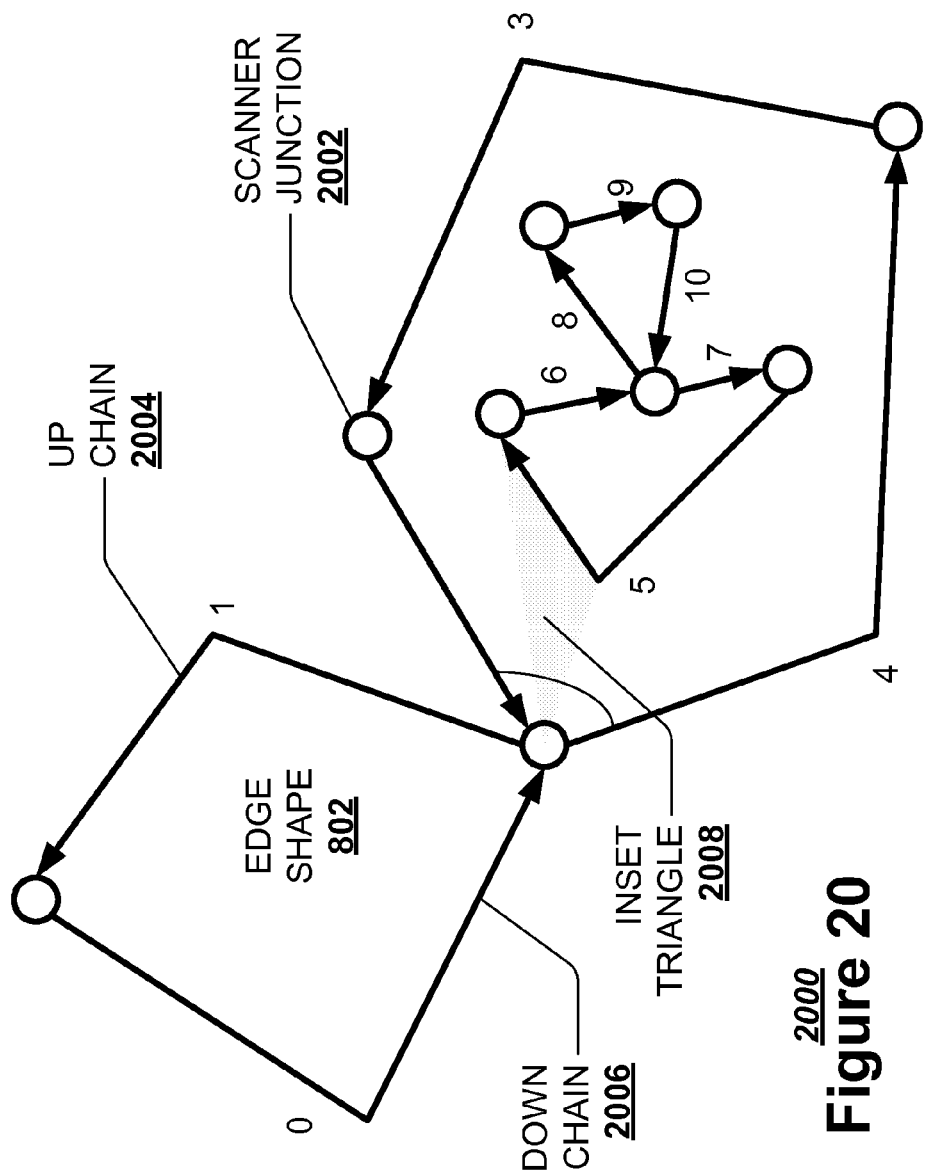
FIG. 20 illustrates, in a block diagram, an exemplary scanner module outline.

The scanner module may tessellate and outline a geometry simultaneously. FIG. 20 illustrates, in a block diagram, an exemplary scanner module outline 2000. The dots represent a scanner junction 2002, with the numbers identifying up chains 2004 connecting the scanner junctions 2002 in an ascending pattern and down chains 2006 connecting the scanner junctions 2002 in a descending pattern.

The scanner module may use a network of triangles to determine which triangles belong in which figures, and how to orient them. The scanner module may produce figures that determine displacement during antialiasing. If a vertex exists in two different triangles from two different figures, the scanner module may duplicate this vertex for displacement in both directions to avoid sharing between figures.

The scanner module may produce an aliased tessellation as references stored to the scanner vertices. The scanner module may use the scanner vertex references to determine adjacency between vertices on the outline of the geometry. The scanner module may store the triangle references in a list.

While tessellation is occurring, the scanner module may organize the incoming and outgoing chains into pre-figures. The scanner module may process the scanner junctions 2002 in descending order. The scanner module may receive a set of incoming chains and outgoing chains. The total number of chains may be even at any junction. The outgoing chains may be incomplete, but begin pointing in the correct direction. If a junction has two outgoing chains, the scanner module may create a new pre-geometry. If a junction has two incoming chains, the scanner module may close the pre-geometry. If a junction has more than two chains, the scanner module may connect the chains so that the space between the connected chains is on the interior of the shape. The scanner module may determine the interior by looking at whether the chains are "left" or "right" chains. The scanner junction 2002 may have at least one left chain and at least one right chain. Making a rotational sweep, clockwise, the scanner module 2002 may connect the first left chain followed by a right chain. After that, the scanner module may connect every two consecutive chains.

For the scanner module outline 2000, the scanner module may connect the chains into the following pre-figures:

(0,1), (2,4,3), (5,6,8,9,10,7)

The scanner module may assign each vertex of the pre-geometry an index. The scanner module may assign a vertex on a scanner junction 2002 a new index every second time the scanner junction 2002 is processed. Thus, the scanner module may ensure a unique index when a scanner junction 2002 is used by multiple figures, or when a scanner junction is used by the same geometry twice. Each time a new index is generated, the scanner module may output the vertex position as part of the tessellation.

When a geometry is started, the scanner module may output the last vertex twice before the first vertex, updating the current index number to prevent the accidental merging of separate figures. Similarly, when a geometry is closed, the scanner module may output a start position along with a repeated second vertex so that the last vertex may identify a neighbor and avoid producing non-degenerate triangles.

For example, if a geometry has 5 vertices, such as ABCDE, the scanner module may output vertices E,E,A,B, C,D,E,A,B,B. By repeating the second vertex and the last vertex, the scanner module may create both a degenerate interior triangle and a degenerate contour between figures. The scanner module may make the contours degenerate by detecting that one of the adjacent geometry edges is degenerate in the vertex shader.

Using the output of the aliased tessellation produced, the scanner module may produce a tessellation in two different streams of indices, with one stream of indices for boundary triangles and one stream of indices for non-boundary triangles. To do this, the scanner module may assign memory to store one index for each boundary vertex. The scanner module first may populated the memory with indices representing degenerate triangles.

The scanner module may process each triangle. For each triangle that has at least one edge on the figure, the scanner module may choose an edge and update the index for the second vertex of that edge with the index of the triangle vertex that is not on that edge. For any triangle that has no edges on the figure, the scanner module may store that triangle as a non-boundary triangle.

Most vertices may have just one index, but the vertices at junctions created by the intersection of four or more chains may have more than one index. The scanner module may choose for boundary triangles the index corresponding to the chains that lie on the edge of the triangle. For non-boundary triangles, the scanner module may perform a rotation sweep around the junction to find the nearest chain. For example, the left vertex of the inset triangle 2008 may result in a sweep to identify the index associated with chains 2 and 4.

Figure 21:
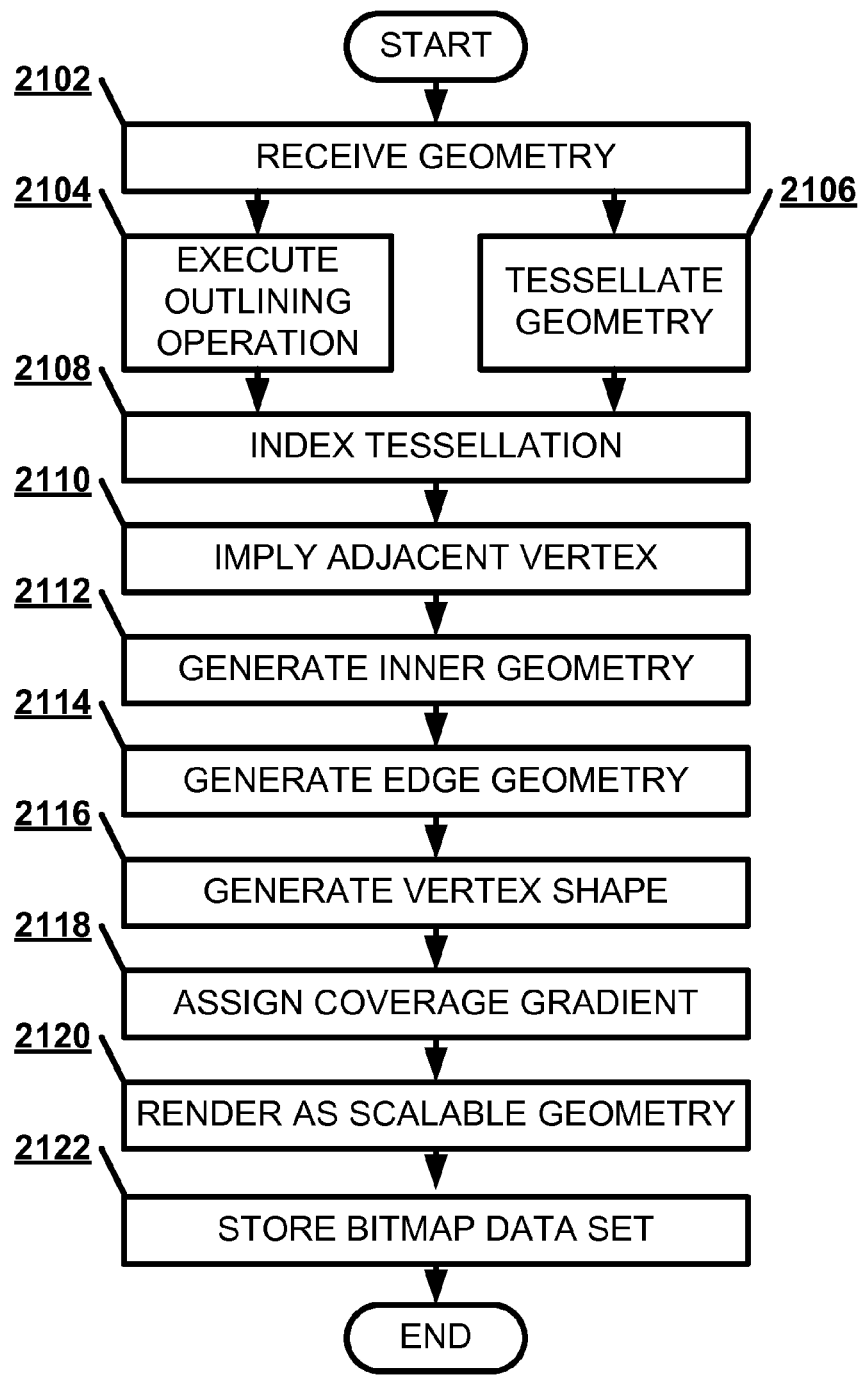
FIG. 21 illustrates, in a flowchart, an exemplary method of augmented shape realization.

FIG. 21 illustrates, in a flowchart, an exemplary method 2100 of augmented shape realization. A central processing unit, such as the central processing unit 120, may receive a geometry, such as geometry 300, for display (Block 2102). The central processing unit may execute an outlining operation on the geometry (Block 2104). The central processing unit may tessellate the geometry simultaneous with the outlining operation (Block 2106). A graphics processing unit, such as graphics processing unit 130, may represent a vertex of at least one of an inner shape of the inner geometry and an edge shape of the tessellated edge geometry in an index (Block 2108). The graphics processing unit may imply an adjacent vertex with the relative index (Block 2110). The graphics processing unit also may generate an inner geometry for the geometry (Block 2112). The graphics processing unit further may generate a tessellated edge geometry abutting the inner geometry for an edge of the geometry (Block 2114). The graphics processing unit further may generate a vertex shape abutting the inner geometry for a vertex of the geometry (Block 2116). The graphics processing unit also may assign a coverage gradient to the tessellated edge geometry to create an anti-aliased edge for the geometry (Block 2118). The graphics processing unit further may render the geometry as a scalable geometry (Block 2120). The graphics processing unit further may store a bitmap data set with a geometry data set for the geometry, such as the text shape, in a one dimensional layout in a graphics buffer (Block 2122).

Figure 22:
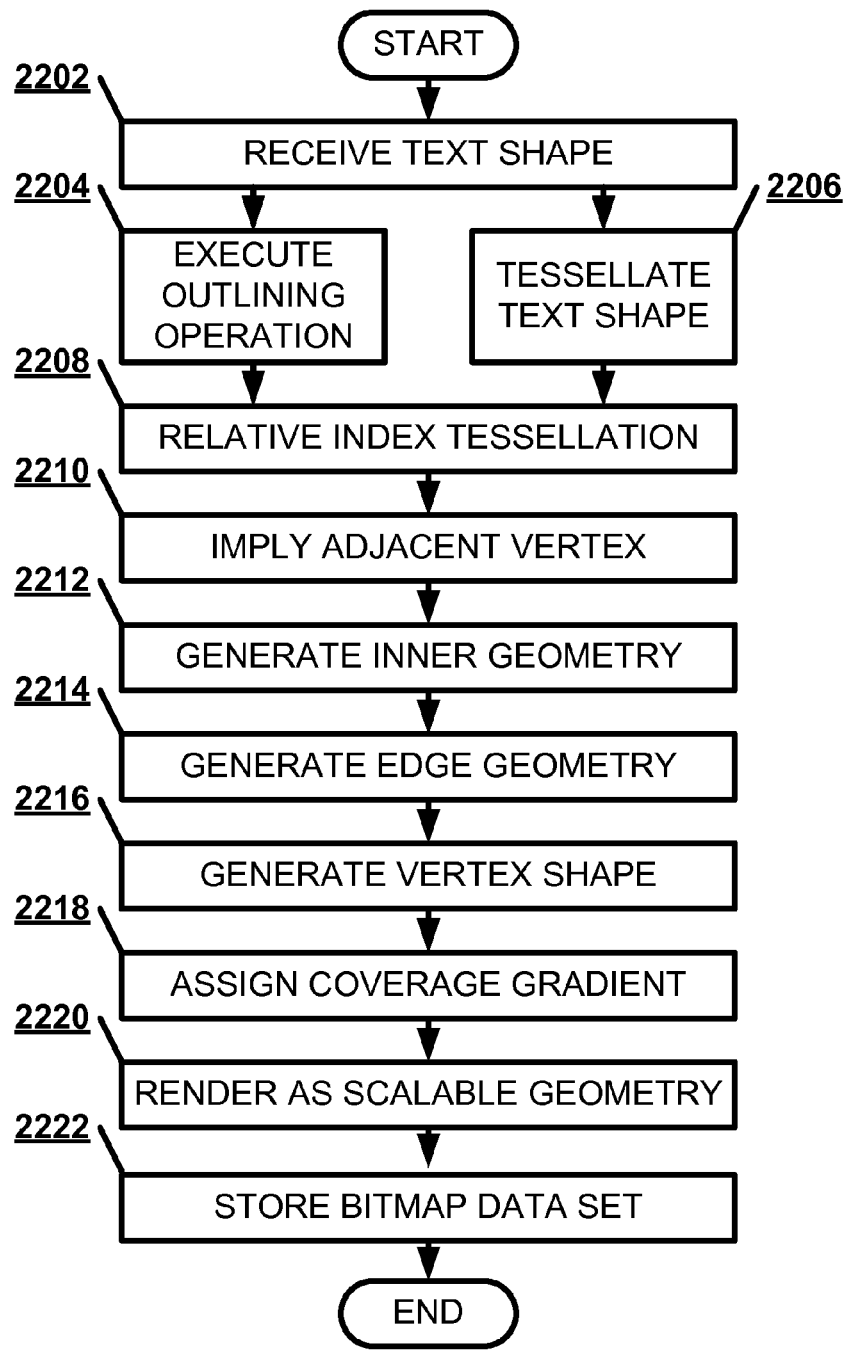
FIG. 22 illustrates, in a flowchart, an exemplary method of augmented text realization.

FIG. 22 illustrates, in a flowchart, an exemplary method 2200 of augmented text realization. A central processing unit, such as the central processing unit 120, may receive a text shape for display (Block 2202). The central processing unit may execute an outlining operation on the text shape (Block 2204). The central processing unit may tessellate the text shape simultaneous with the outlining operation (Block 2206). A graphics processing unit, such as the graphics processing unit 130, may represent a vertex of at least one of an inner shape of the inner geometry and an edge shape of the tessellated edge geometry in an index (Block 2208). The graphics processing unit may imply an adjacent vertex with the relative index (Block 2210). The graphics processing unit also may generate an inner geometry for the text shape (Block 2212). The graphics processing unit further may generate a tessellated edge geometry abutting the inner geometry for an edge of the text shape (Block 2214). The graphics processing unit further may generate a vertex shape abutting the inner geometry for a vertex of the geometry (Block 2216). The graphics processing unit also may assign a coverage gradient to the tessellated edge geometry to create an anti-aliased edge for the text shape (Block 2218). The graphics processing unit further may render the text shape as a scalable geometry (Block 2220). The graphics processing unit further may store a bitmap data set with a geometry data set for the geometry, such as the text shape, in a one dimensional layout in a graphics buffer (Block 2222).

Figure 23:
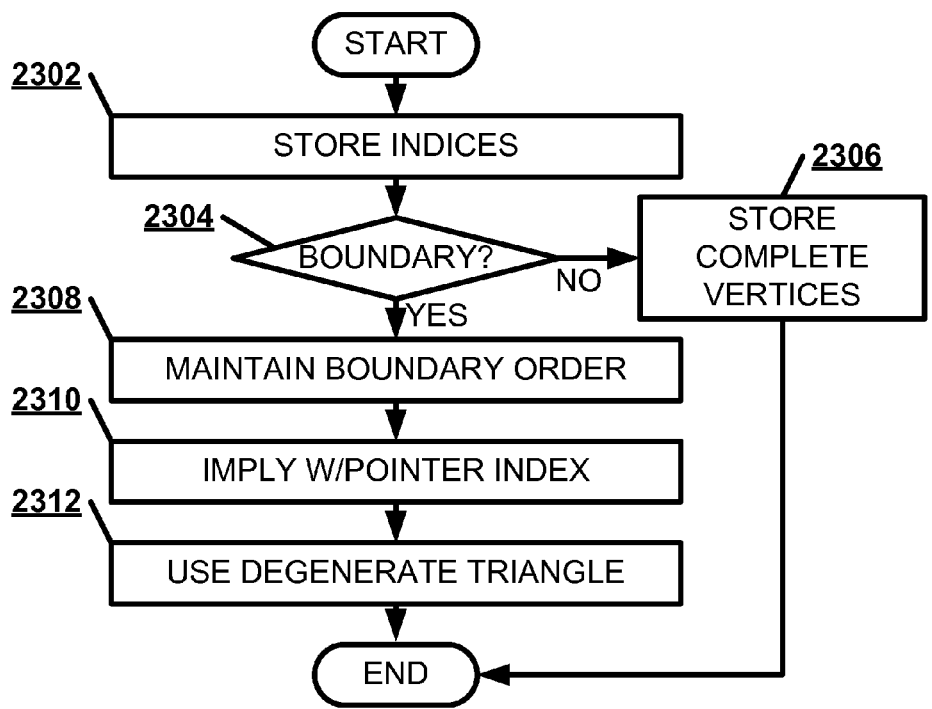
FIG. 23 illustrates, in a flowchart, an exemplary method of boundary triangle representation.

FIG. 23 illustrates, in a flowchart, an exemplary method 2300 of boundary triangle representation. A graphics processing unit, such as the graphics processing unit 130, may store an indices set indicating a triangle set, including a boundary triangle set around a boundary of the geometry, such as a text shape, and a landlocked triangle set of the geometry (Block 2302). The geometry may be a text shape. If a boundary bit in the instance data indicates that the triangle is a landlocked triangle (Block 2304), the graphics processing unit may store a complete vertices set for the landlocked triangle (Block 2306). If a boundary bit in the instance data indicates that the triangle is a boundary triangle (Block 2304), the graphics processing unit may maintain the indices set as matching an order of the boundary triangle set (Block 2308). The graphics processing unit may implying a first edge vertex and a second edge vertex of a boundary triangle with a pointer index (Block 2310). The graphics processing unit also may use a degenerate triangle as a placeholder for a double-bounded boundary triangle (Block 2312).

Figure 24:
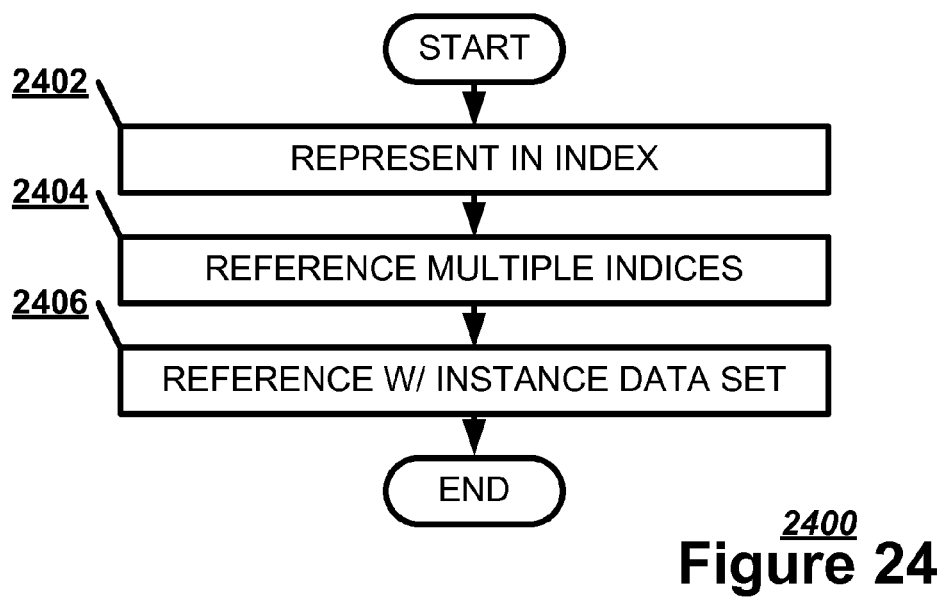
FIG. 24 illustrates, in a flowchart, an exemplary method of relative indexing.

FIG. 24 illustrates, in a flowchart, an exemplary method 2400 of relative indexing. A graphics processing unit, such as the graphics processing unit 130, may represent a vertex of at least one of an inner shape of the inner geometry and an edge shape of the tessellated edge geometry in an index (Block 2402). The graphics processing unit may reference multiple indices with an instance data set (Block 2404). The graphics processing unit also may represent a geometry portion, such as a glyph instance of the texts shape, with the instance data set (Block 2406).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
generating, in a graphics processor, an inner geometry for a text shape;
generating, in the graphics processor, a tessellated edge geometry abutting the inner geometry for an edge of the text shape;
assigning, in the graphics processor, a coverage gradient to an exterior vertex of the tessellated edge geometry to indicate transparency of the exterior vertex relative to opacity of the tessellated edge geometry; and
storing, in a graphics buffer, an indices set indicating a boundary triangle set around a boundary of the text shape using a degenerate triangle as a placeholder in the indices set.

2. The method of claim 1, further comprising:
representing a vertex of at least one of an inner shape of the inner geometry and an edge shape of the tessellated edge geometry in an index.

3. The method of claim 1, further comprising:
representing a glyph instance of the text shape with an instance data set.

4. The method of claim 1, further comprising:
referencing multiple indices with an instance data set.

5. The method of claim 1, further comprising:
implying an adjacent vertex with an index.

6. The method of claim 1, further comprising:
generating a vertex shape abutting the inner geometry for a vertex of the geometry.

7. The method of claim 1, further comprising:
maintaining the indices set as matching an order of the boundary triangle set.

8. The method of claim 1, further comprising:
implying a first edge vertex and a second edge vertex of a boundary triangle of the boundary triangle set with a pointer index.

9. The method of claim 1, further comprising:
executing an outlining operation on the text shape.

10. The method of claim 1, further comprising:
tessellating the text shape simultaneous with an outlining operation.

11. The method of claim 1, further comprising:
storing a bitmap data set with a geometry data set for the text shape in a one-dimensional layout in the graphics buffer.

12. The method of claim 1, further comprising:
rendering the text shape as a scalable geometry.

13. A tangible machine-readable medium having a set of instructions detailing a method stored thereon that when executed by a processing system having one or more processors cause the processing system to perform:
generating an inner geometry for a geometry;
generating a tessellated edge geometry abutting the inner geometry for an edge of the geometry;
representing a vertex of at least one of an inner shape of the inner geometry and an edge shape of the tessellated edge geometry in an index;
implying an adjacent vertex with the index;
storing an indices set indicating a boundary triangle set around a boundary of the geometry using a degenerate triangle as a placeholder in the indices set; and
assigning a coverage gradient to an exterior vertex of the tessellated edge geometry to indicate transparency of the exterior vertex relative to opacity of the tessellated edge geometry.

14. The tangible machine-readable medium of claim 13, wherein the method further comprises:
storing a bitmap data set with a geometry data set for the geometry in a one-dimensional layout in a graphics buffer.

15. The tangible machine-readable medium of claim 13, wherein the method further comprises:
maintaining the indices set as matching an order of the boundary triangle set.

16. The tangible machine-readable medium of claim 13, wherein the method further comprises:
implying a first edge vertex and a second edge vertex of a boundary triangle of the boundary triangle set with a pointer index.

17. The tangible machine-readable medium of claim 13, wherein the method further comprises:
referencing multiple indices with an instance data set.

18. The tangible machine-readable medium of claim 13, wherein the method further comprises:
executing an outlining operation on the geometry; and
tessellating the geometry simultaneous with the outlining operation.

19. A graphics processing unit, comprising:
a graphics buffer that represents a geometry by storing a vertex indices set indicating a boundary triangle set around a boundary of the geometry maintained in an order of the boundary triangle set using a degenerate triangle as a placeholder in the indices set; and
a graphics processor that implies a first edge vertex and a second edge vertex of a boundary triangle of the boundary triangle set from a pointer vertex index.

20. The graphics processing unit of claim 19, wherein the graphics buffer is configured to store a bitmap data set with a geometry data set for the geometry in a one-dimensional layout.

* * * * *